United States Patent
Ekholm et al.

(10) Patent No.: US 10,151,099 B2
(45) Date of Patent: Dec. 11, 2018

(54) UNDERDRAIN ASSEMBLY

(71) Applicant: Bilfinger Water Technologies, Inc., New Brighton, MN (US)

(72) Inventors: Michael Richard Ekholm, Minneapolis, MN (US); Richard Charles Maxson, Maple Grove, MN (US); Mark Edgar Watson, Starbridge, MA (US); Fabrice Jean Alphonse Courageot, Saint Georges les Baillargeaux (FR)

(73) Assignee: Aqseptence Group, Inc., New Brighton, MN (US)

( * ) Notice: Subject to any disclaimer, the term of this patent is extended or adjusted under 35 U.S.C. 154(b) by 212 days.

(21) Appl. No.: 14/767,888

(22) PCT Filed: Feb. 14, 2014

(86) PCT No.: PCT/US2014/016464
§ 371 (c)(1),
(2) Date: Aug. 13, 2015

(87) PCT Pub. No.: WO2014/127226
PCT Pub. Date: Aug. 21, 2014

(65) Prior Publication Data
US 2015/0376889 A1 Dec. 31, 2015

Related U.S. Application Data

(60) Provisional application No. 61/765,375, filed on Feb. 15, 2013.

(51) Int. Cl.
*B01D 24/24* (2006.01)
*E03F 5/06* (2006.01)
*B01D 24/46* (2006.01)

(52) U.S. Cl.
CPC ............ *E03F 5/06* (2013.01); *B01D 24/24* (2013.01); *B01D 24/4631* (2013.01)

(58) Field of Classification Search
CPC .... B01D 24/22; B01D 24/263; B01D 24/266; B01D 24/24; B01D 24/4631; E03F 5/06
See application file for complete search history.

(56) References Cited

U.S. PATENT DOCUMENTS

| 1,788,383 A | 1/1931 | Delery |
| 2,076,322 A * | 4/1937 | Pick ............... B01D 24/005 210/138 |

(Continued)

FOREIGN PATENT DOCUMENTS

| JP | H06 86904 A | 3/1994 |
| RU | 2312955 C2 | 12/2007 |

(Continued)

OTHER PUBLICATIONS

PCT Notification of Transmittal of The International Search Report and the Written Opinion of the International Searching Authority, or the Declaration; for Application No. PCT/US2014/16464 dated Apr. 23, 2014; 14 pages.

(Continued)

*Primary Examiner* — Matthew O Savage
(74) *Attorney, Agent, or Firm* — Patterson Thuente Pedersen, P.A.

(57) ABSTRACT

An underdrain assembly for filtering particulates from a fluid having an upper structure connected to a bottom plate. At least one flow control vane is positioned between the upper structure and the bottom plate for directing and managing fluid flow through the assembly. The upper structure can have first and second filtration members, the second filtration member positioned between the first filtration member and the bottom plate. The second filtration member can have a shape that restricts fluid flow within the underd- (Continued)

rain. The underdrain can have air and water inlets. The water inlet can have an end with a plate covering an upper portion thereof. The end can also include an opening having an angular cut forming an angle with respect to a longitudinal axis of the water inlet. Thus arranged, air is prevented from migrating out the water line. A resilient mounting arrangement for the underdrain is also disclosed.

8 Claims, 19 Drawing Sheets

(56) References Cited

U.S. PATENT DOCUMENTS

| | | | |
|---|---|---|---|
| 3,918,483 | A | 11/1975 | Van Leeuwen |
| 4,065,391 | A | 12/1977 | Farabaugh |
| 4,096,911 | A | 6/1978 | Geske |
| 5,019,259 | A | 5/1991 | Hambley |
| 5,156,738 | A | 10/1992 | Maxson |
| 5,160,613 | A | 11/1992 | Walter |
| 5,232,592 | A | 8/1993 | Brown et al. |
| 5,328,608 | A | 7/1994 | Bergmann et al. |
| 8,516,678 | B2 * | 8/2013 | Hennemann .......... F16L 37/088 285/319 |
| 2004/0031743 | A1 | 2/2004 | Roberts et al. |
| 2008/0041780 | A1 | 2/2008 | Frey et al. |
| 2008/0099411 | A1 | 5/2008 | Roberts et al. |
| 2008/0121580 | A1 | 5/2008 | Ekholm et al. |
| 2011/0073549 | A1 | 3/2011 | Geibel et al. |
| 2012/0048793 | A1 | 3/2012 | Roberts et al. |

FOREIGN PATENT DOCUMENTS

| | | |
|---|---|---|
| RU | 2373339 C2 | 11/2009 |
| WO | WO 95/27549 | 10/1995 |
| WO | WO 97/00110 | 1/1997 |

OTHER PUBLICATIONS

Office Action dated Jul. 28, 2016 for Chinese Application No. 20140021319.0, 13 pages.
Office Action dated Jul. 4, 2017 for Chinese Application No. 201480021319.0, 8 pages.
Supplementary Search Report dated Mar. 6, 2017 for EP Application No. 14751249, 12 pages.
Examination Report dated Oct. 4, 2017 for Australian Application No. 2014216190, 7 pages.
Search Report dated Oct. 11, 2016 for EP Application No. 14751249. 5, 7 pages.

* cited by examiner

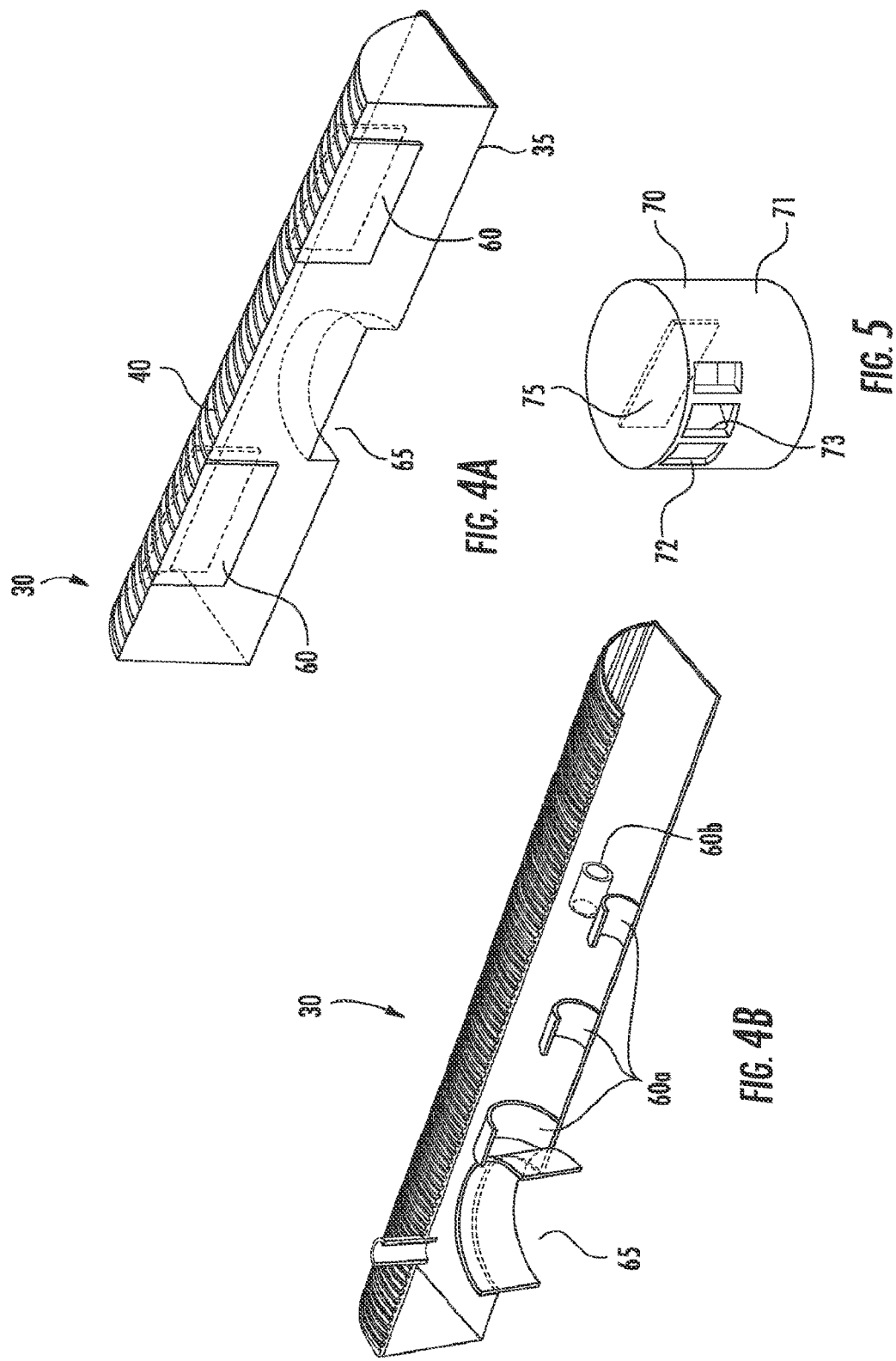

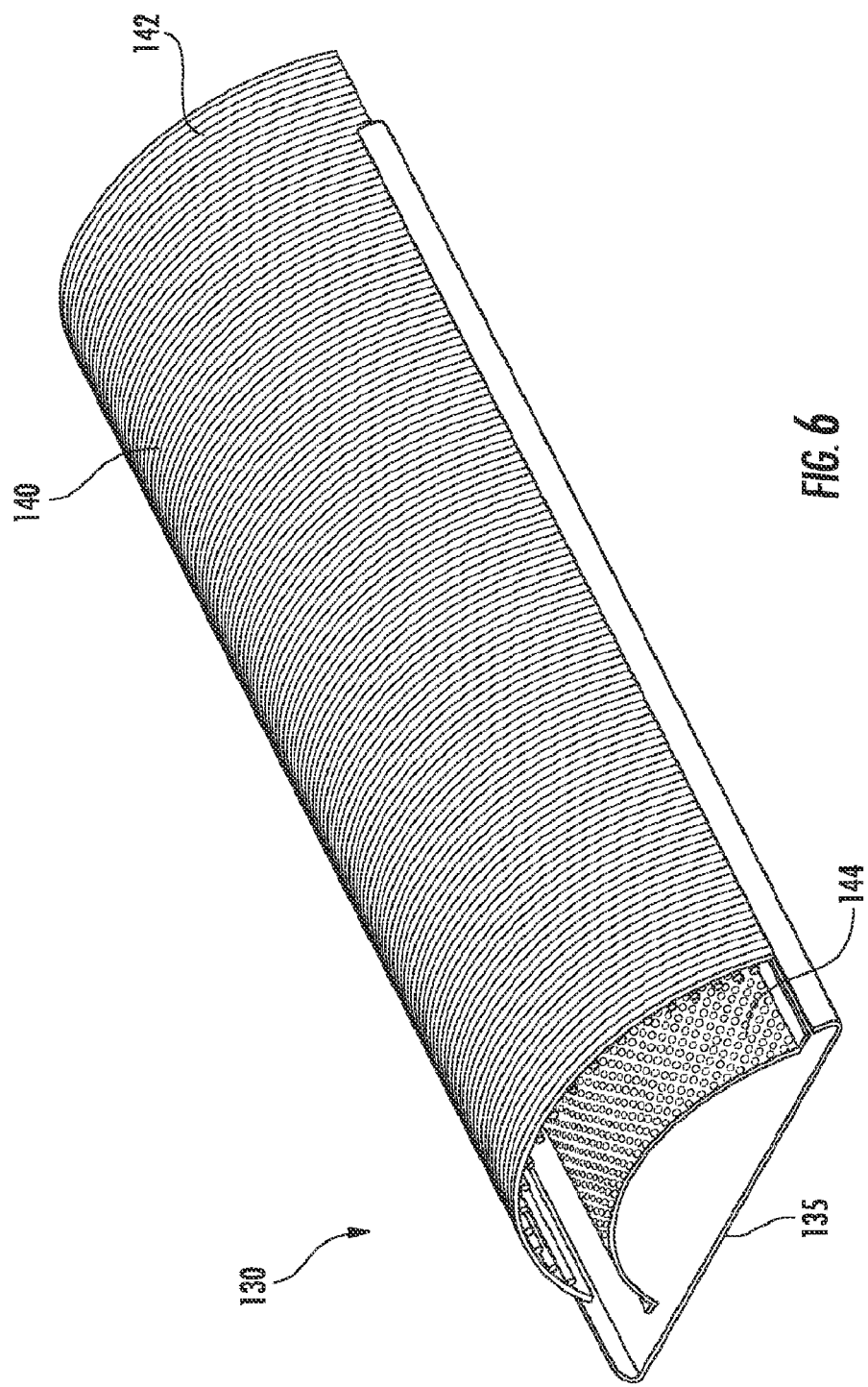

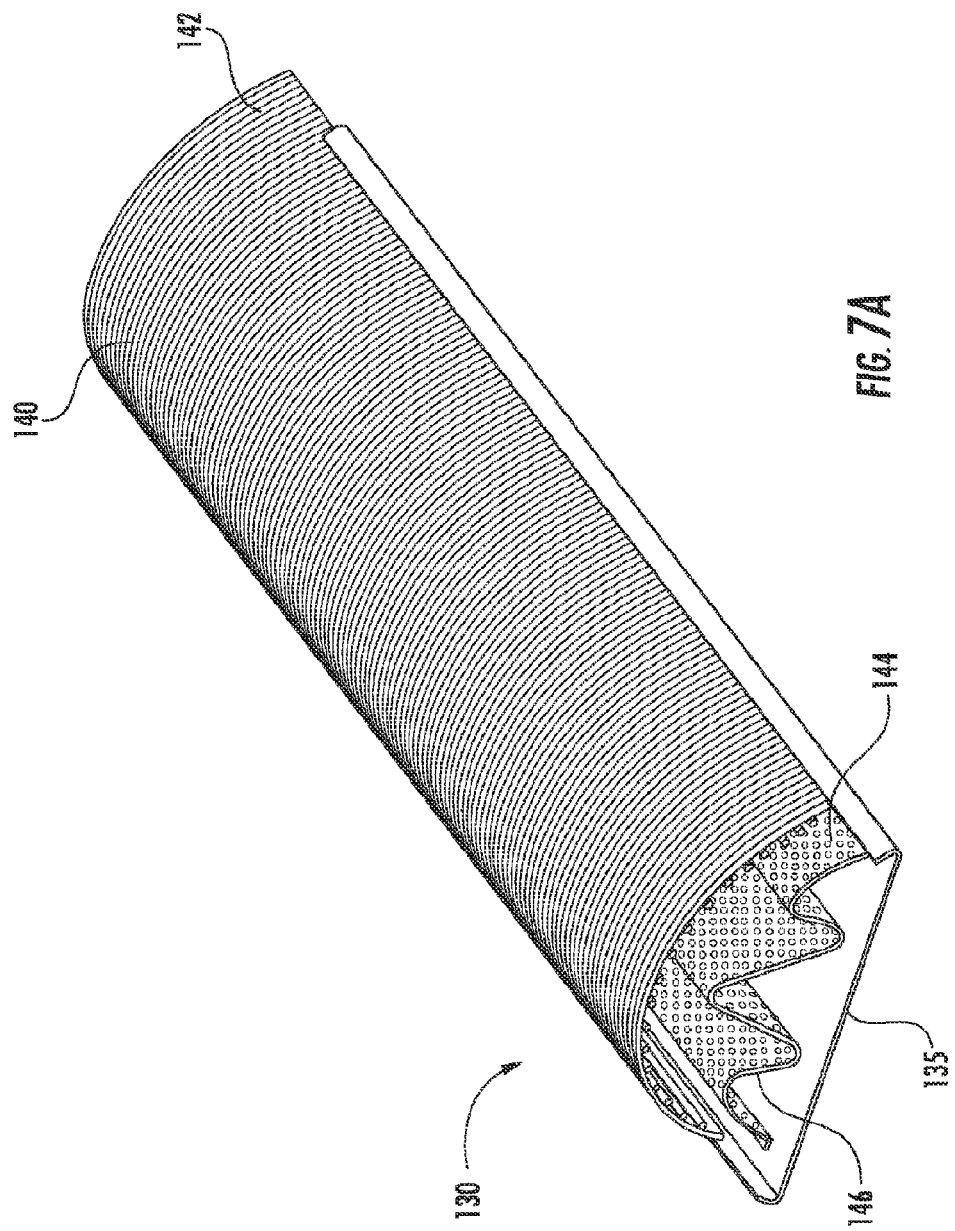

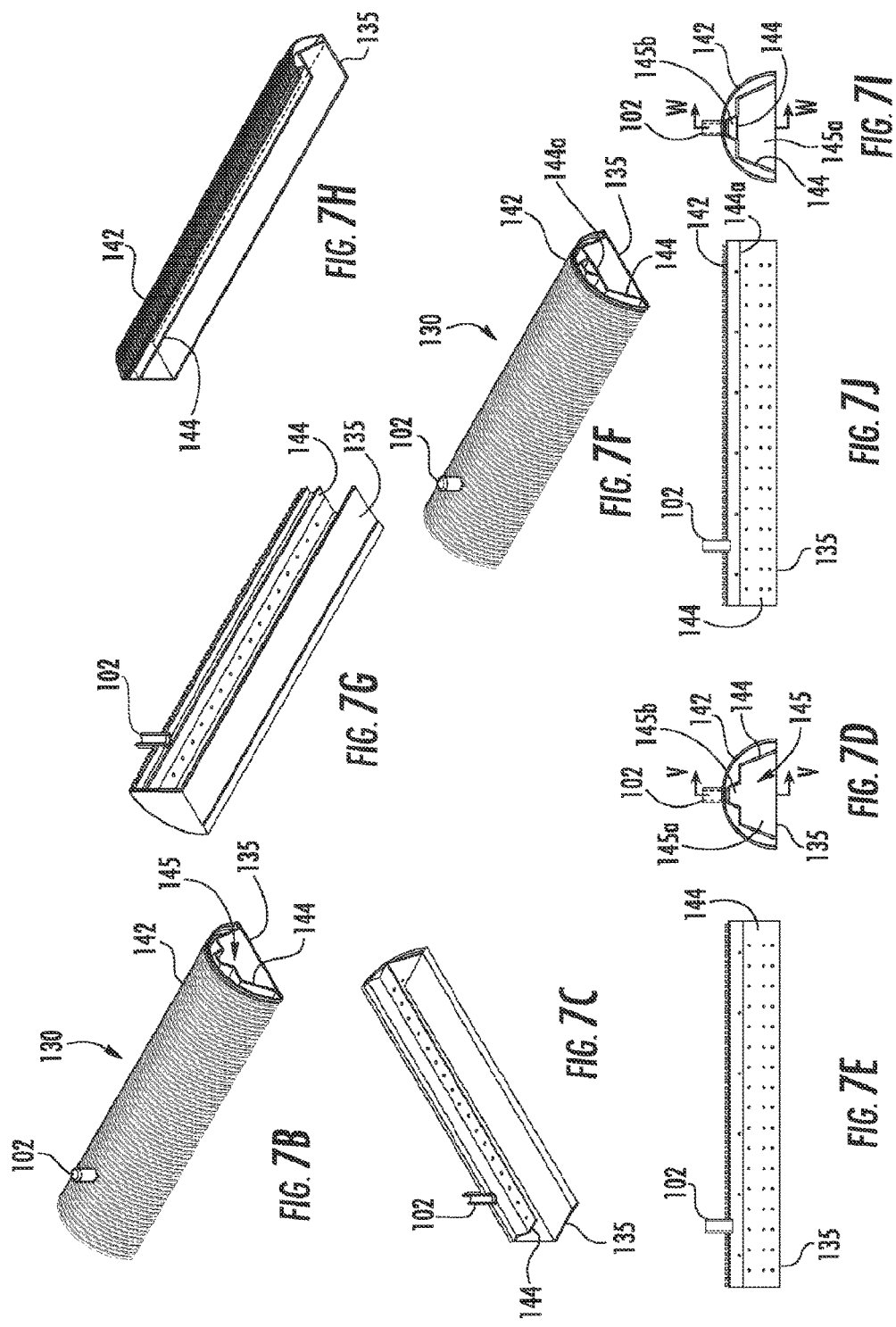

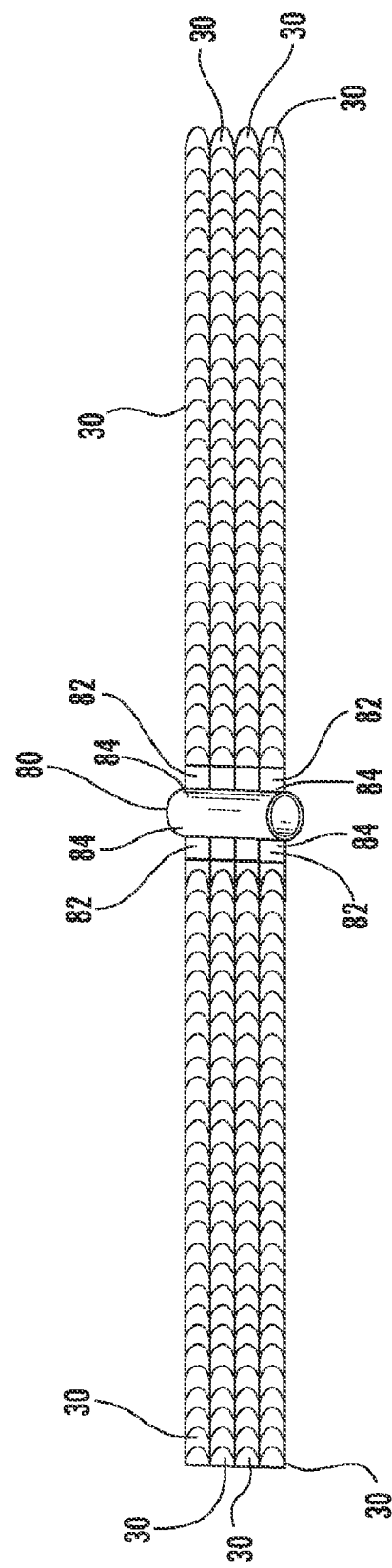

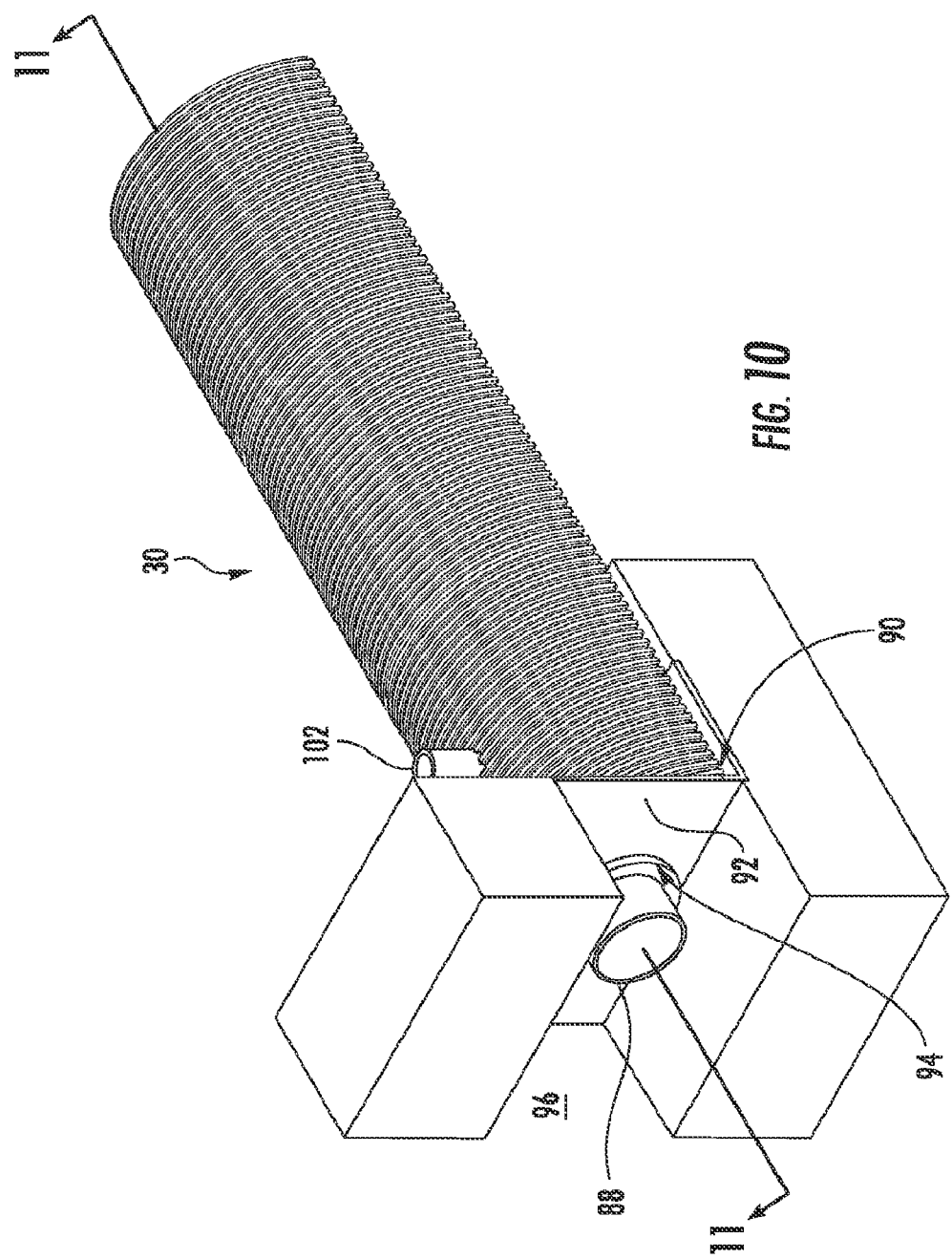

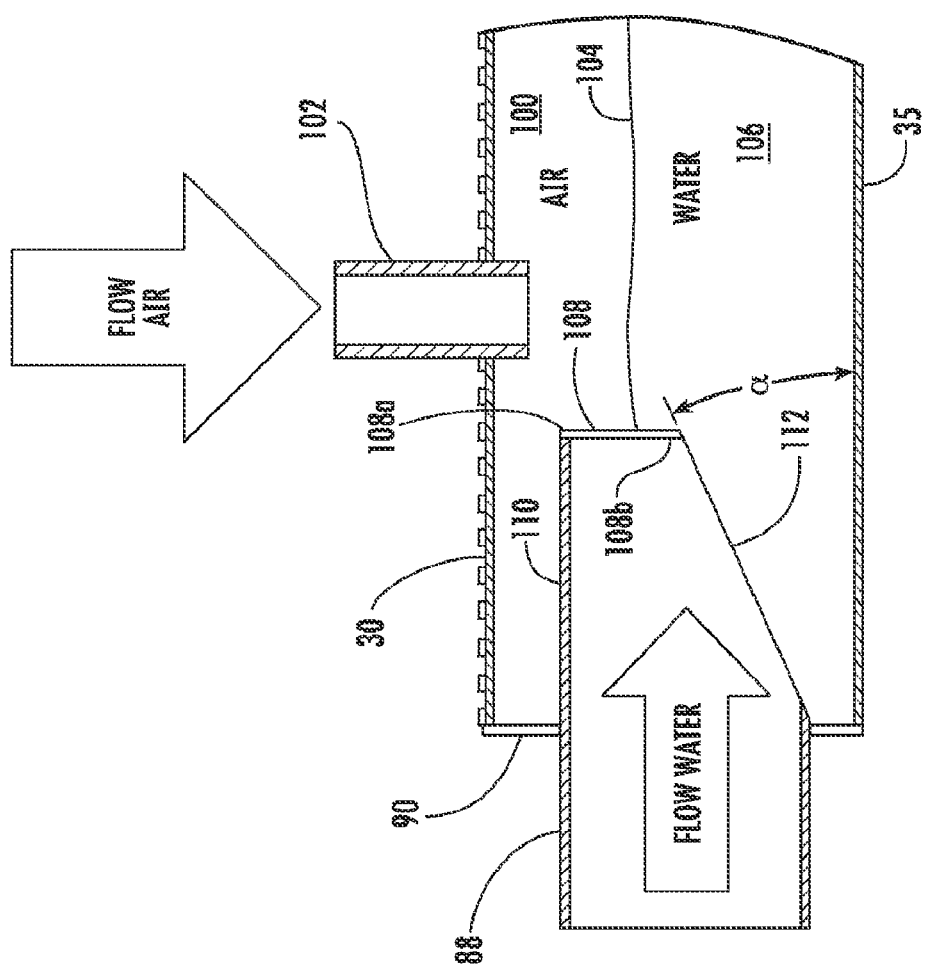

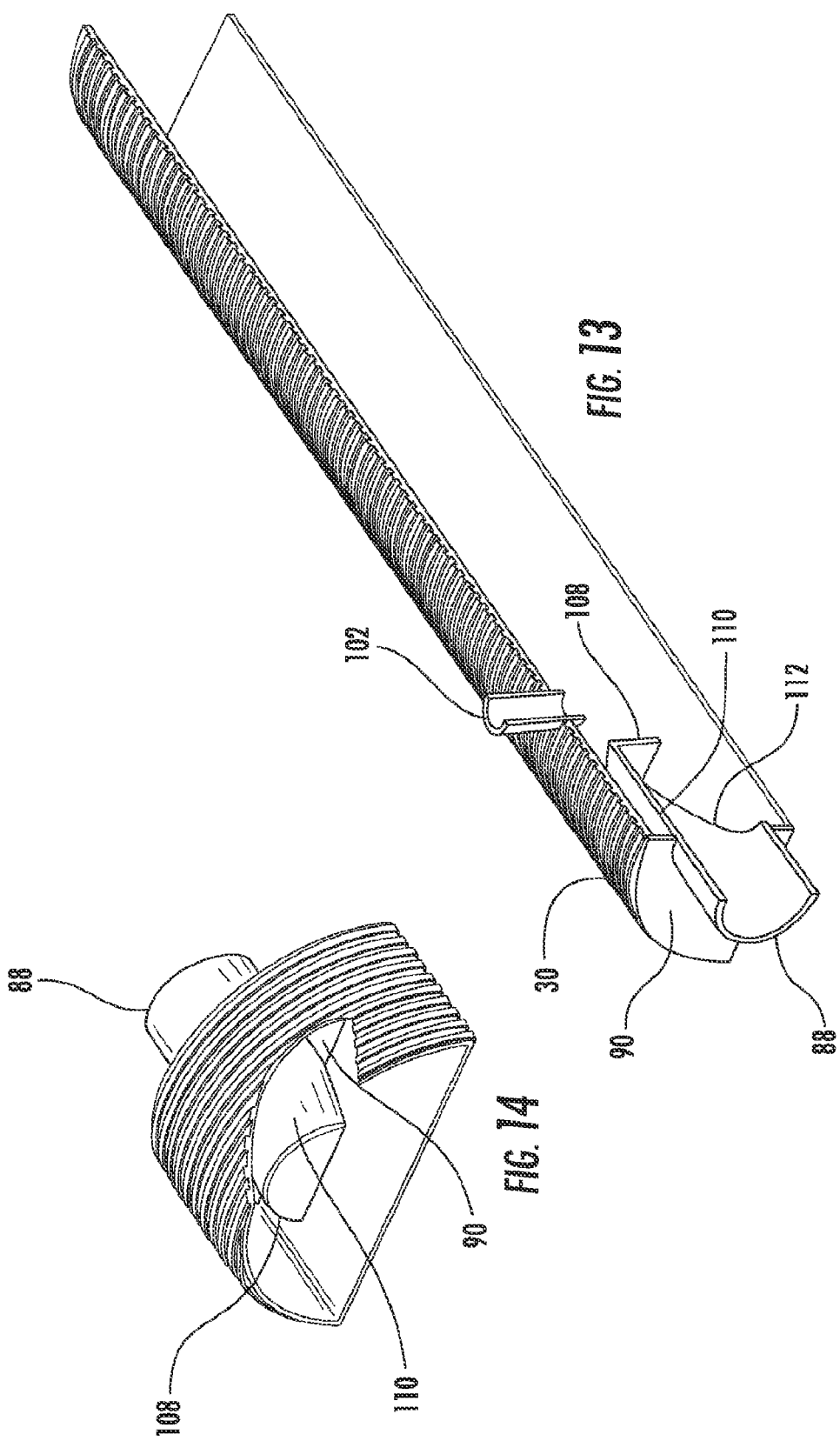

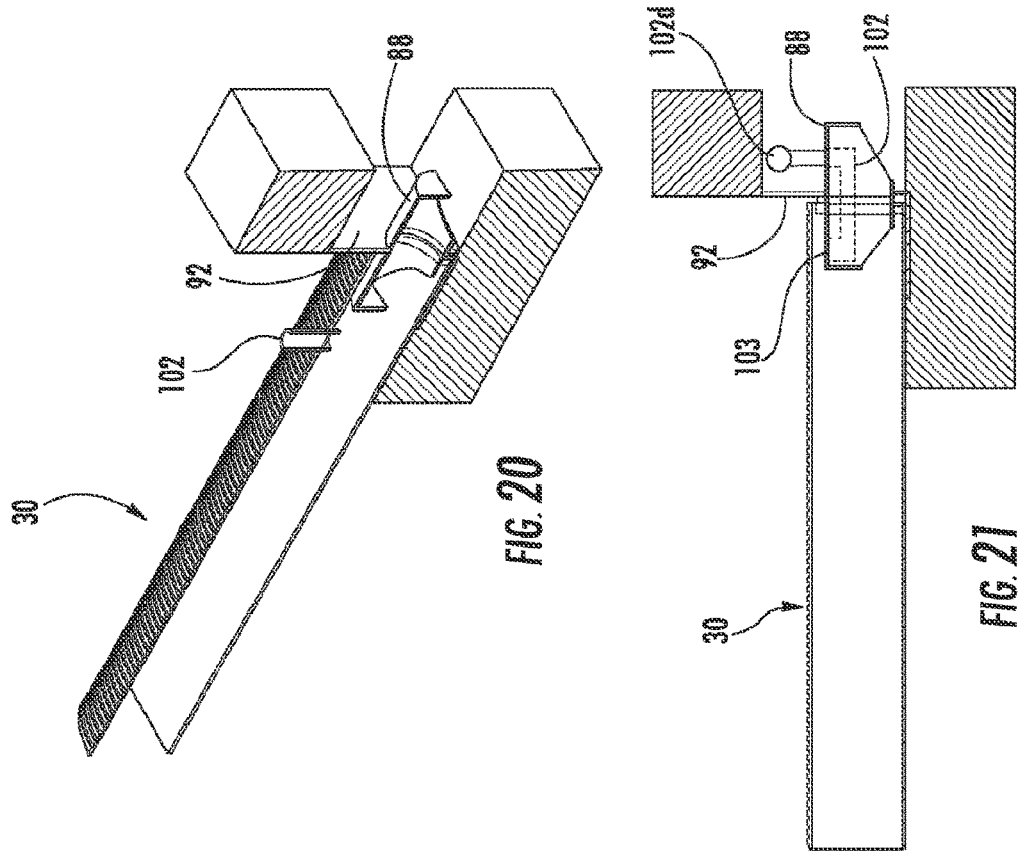
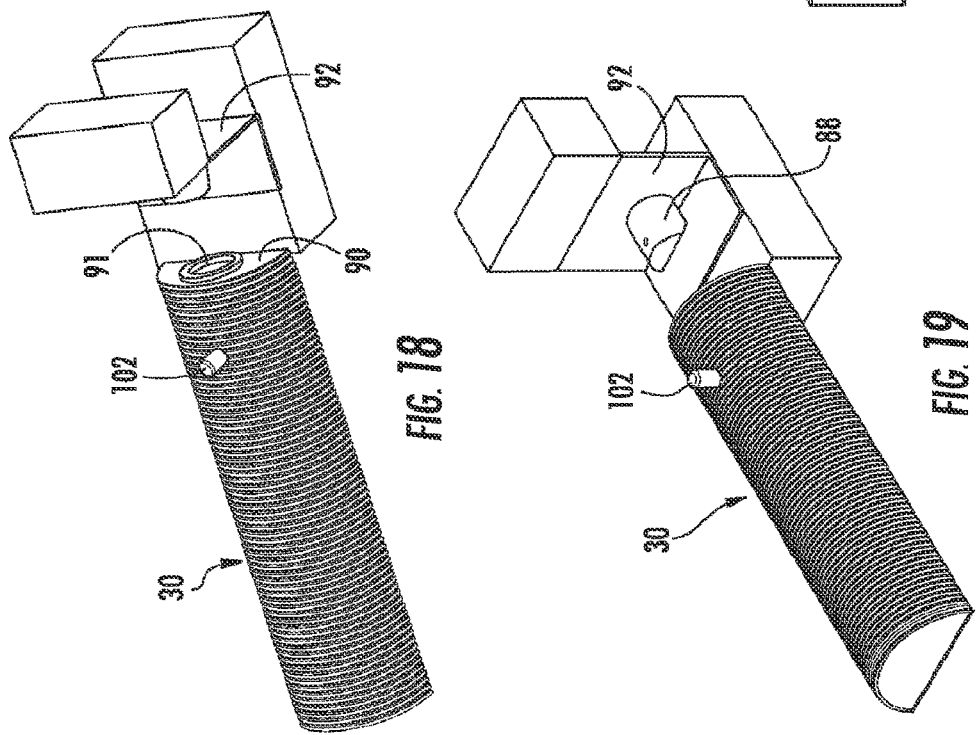

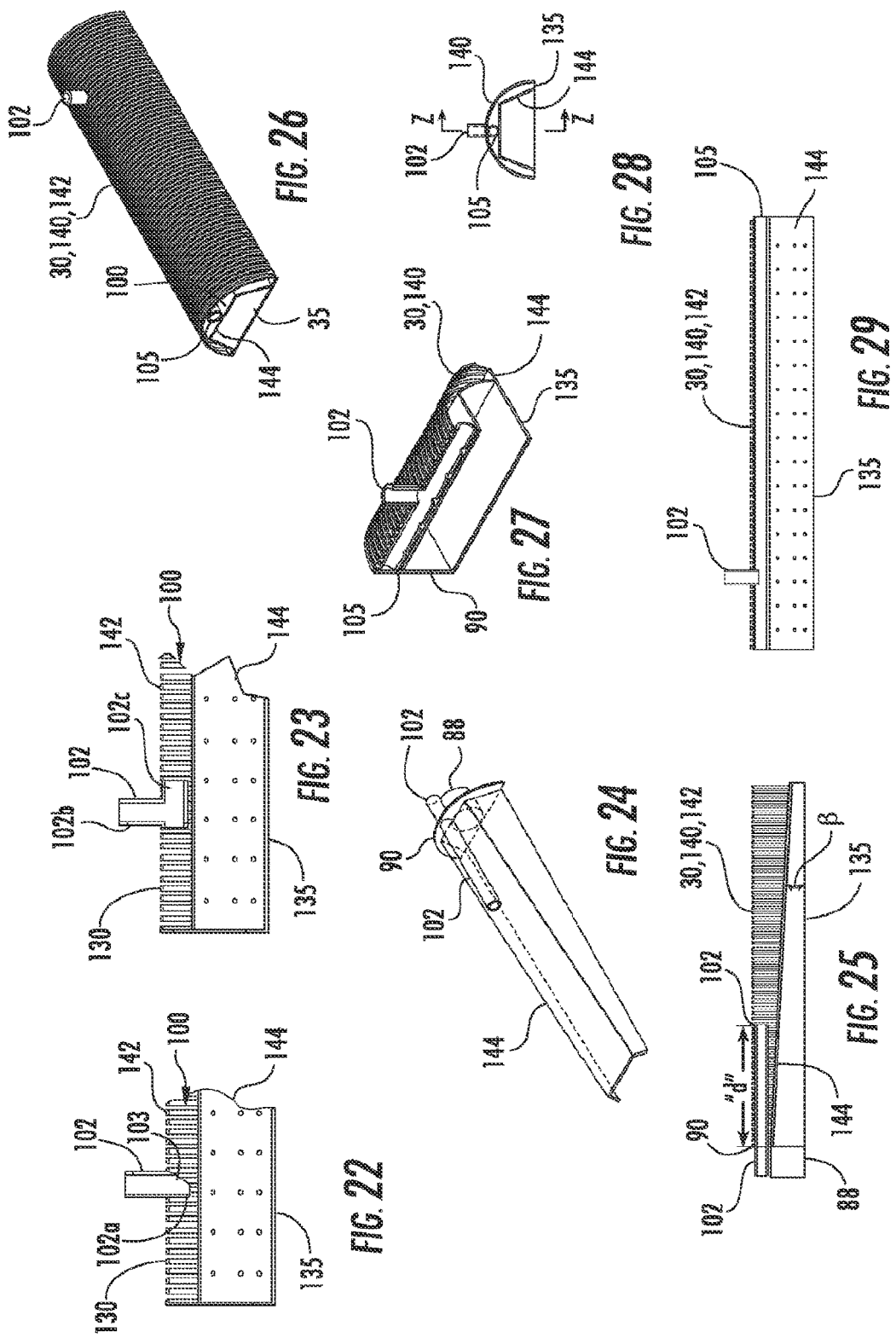

UNDERDRAIN ASSEMBLY

CROSS-REFERENCE TO RELATED APPLICATION

This application claims priority to U.S. Provisional Patent Application Ser. No. 61/765,375 filed Feb. 15, 2013, the entirety of which provisional application is incorporated by reference herein.

BACKGROUND OF THE INVENTION

Field of the Invention

Embodiments of the invention generally relate to an assembly and method of filtration. More specifically, the invention relates to an assembly and method for underdrain filtration.

Description of the Related Art

Underdrain assemblies are designed to filter various particulates from large volumes of fluid, such as water. In general, "dirty" water is sent through filter media to help remove particulates, and reaches a plurality of underdrains that are designed to keep the filter media out, yet allow for the water to drain into and through the underdrain. Each underdrain has an opening that leads to a centralized trench that collects all filtered water, and the filtered water is eventually removed from the trench. Underdrain assemblies may also allow water to be backwashed for cleaning and/or filtering purposes. During the backwash process, water may be injected into the centralized trench, moved up through the plurality of underdrains, and out through the filter media.

Ideally, fluid is evenly distributed throughout the length of an underdrain, and fluid flow rates are steady throughout the length of the underdrain into the trench. However, underdrain assemblies have increased in size over the years, and the distribution of fluid and fluid flow through the underdrain assemblies have become problematic. In addition, the design of current flume plates, which support underdrains on top of trenches, may lead to issues when fluid moves from the underdrains into the trench, and installing extended lengths of underdrain assemblies have also become more challenging.

What is needed is an assembly and method of underdrain filtration that avoids problems associated with current underdrain assemblies.

SUMMARY OF THE INVENTION

In one embodiment, the invention generally relates to an underdrain apparatus that includes an upper structure for filtering particulates from a fluid which is connected to a bottom plate. At least one flow control vane is positioned between the upper structure and the bottom plate.

In one embodiment, the invention relates to an underdrain apparatus comprising an upper structure for filtering particulates from a fluid and a bottom plate connected to the upper structure. The upper structure includes a first filtration member and a second filtration member, wherein the second filtration member is positioned between the first filtration member and the bottom plate and includes a formation that restricts fluid flow within the underdrain.

In one embodiment, the invention relates to an underdrain assembly comprising a trench, one or more underdrains positioned across the trench, and a layer of filter media placed over the one or more underdrains. The underdrains include an upper structure for filtering particulates from a fluid, a bottom plate connected to the upper structure that includes an opening for draining the fluid into the trench, and at least one flow control vane positioned between the upper structure and the bottom plate.

In one embodiment, the underdrain assembly may further comprise flume plate or tubular member positioned in the trench for directing fluid flow. The flume plate or tubular member may include smaller pipe extensions, which are then embedded into a floor of the trench, and may allow for the inflow or outflow of fluid.

In one embodiment, in place of a plate over a trench, a large pipe with smaller pipe extensions which are embedded into the floor of the basin can be used. The larger pipe may be connected to piping external to the basin allowing for the inflow and outflow of fluid.

In one embodiment, an underdrain assembly is disclosed, comprising a trench and an underdrain positioned across the trench. The underdrain can include an upper structure for filtering particulates from a fluid, a bottom plate connected to the upper structure and including an opening for draining the fluid into the trench. A water inlet may be provided for introducing water from a chamber into an interior portion of the underdrain. An air inlet may be provided for introducing air into the interior portion of the underdrain. The water inlet may include a first end exposed to the chamber and a second end exposed to the interior portion of the underdrain. The second end may have an end plate coveting an upper portion of the second end. The second end further may include an opening having an angular cut that forms an angle with respect to a longitudinal axis of the water inlet.

In one embodiment, an underdrain assembly is disclosed, comprising an underdrain positioned on a base. The underdrain may include an upper structure for filtering particulates from a fluid, a bottom plate connected to the upper structure, and a hold-down mechanism for adjustably coupling the underdrain to the base. The hold-down mechanism may include an anchor bolt coupled to the base, a hold-down bar coupled to one end of the anchor bolt via a resilient member, and a leveling bolt having a first end in contact with the hold-down bar and a second end in contact with the base. Rotating the leveling bolt may adjust a position of the bottom plate with respect to the base.

In one embodiment, a manifold assembly for a plurality of underdrains, comprising a plurality of underdrains, each of the plurality of underdrains comprising an end connection, and a manifold having a plurality of receiving connections disposed along a longitudinal length of the manifold, each of the plurality of receiving connections configured to receive the end connection of a respective one of the plurality of underdrains.

In one embodiment, an underdrain using sets of perforations for air and water control, can position the perforations strategically to optimize the operational installed angle of the underdrain from a perfect horizontal line. The perforations can be placed in either or the U-shaped channels or the flow control plate.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4A is a cutaway perspective view of an underdrain according to one embodiment of the invention.

FIG. 4B is a cutaway perspective view of an underdrain according to one embodiment of the invention.

FIG. 5 is a perspective view of a top cap according to one embodiment of the invention.

FIG. 6 is a perspective view of an underdrain according to one embodiment of the invention.

FIG. 7A is a perspective view of an underdrain according to one embodiment of the invention.

FIG. 7B is a perspective view of an underdrain according to one embodiment of the invention;

FIG. 7C is a partial cutaway view of the underdrain of FIG. 7B.

FIG. 7D is an end view of the underdrain of FIG. 7B.

FIG. 7E is a cross-section view of the underdrain of FIG. 7B, taken alone line V-V of FIG. 7D.

FIG. 7F is a perspective view of an underdrain according to one embodiment of the invention.

FIGS. 7G and 7H are partial cutaway views of the underdrain of FIG. 7F.

FIG. 7J is a cross-section view of the underdrain of FIG. 7F, taken alone line W-W of FIG. 7I.

FIG. 8 is an illustration of a manifold assembly for a plurality of underdrains according to one embodiment of the invention.

FIG. 10 is a side view of a further embodiment of an underdrain assembly according to an embodiment of the invention;

FIG. 11 is a cross-section view of the underdrain assembly of FIG. 10 taken along line 11-11 of FIG. 10.

FIG. 12 is a detail view of a portion of the cross-section view of FIG. 11.

FIG. 13 is an isometric cutaway view of the underdrain assembly of FIG. 10.

FIG. 14 is a detail cutaway view of a portion of the view of FIG. 13.

FIG. 18 is a perspective view of an embodiment of an underdrain according to one embodiment of the invention, the underdrain positioned apart from a water chamber assembly.

FIG. 19 is a reverse perspective view of the underdrain of FIG. 18.

FIG. 20 is a cutaway perspective view of the underdrain of FIG. 18 engaged with the water chamber assembly.

FIG. 21 is a cross-section view of the underdrain of FIG. 18 engaged with the water chamber assembly.

FIGS. 22 and 23 are cross-section views of embodiments of air inlet lines for use with the underdrain assembly of FIG. 10.

FIG. 24 is a perspective view of a portion of an underdrain assembly according to an embodiment of the invention.

FIG. 25 is a cross section of an underdrain assembly incorporation the portion shown in FIG. 24.

FIG. 26 is a perspective view of an underdrain assembly according to an embodiment of the invention.

FIG. 27 is a partial cutaway view of the underdrain assembly of FIG. 26.

FIG. 28 is an end view of the underdrain assembly of FIG. 26.

FIG. 29 is a cross-section view of the underdrain assembly of FIG. 26, taken alone line Z-Z of FIG. 28.

DETAILED DESCRIPTION

Figure 1:
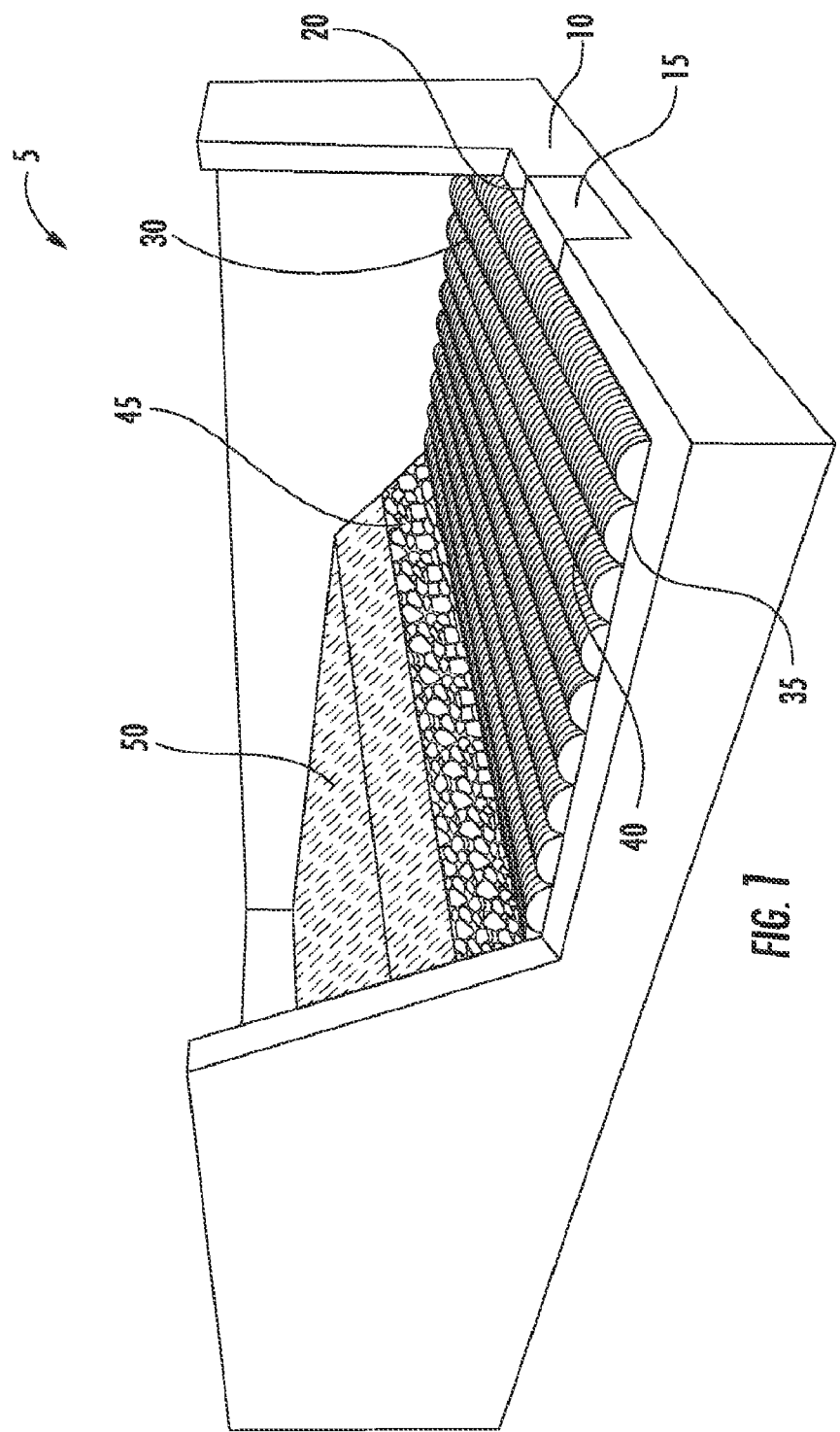
FIG. 1 is a perspective view of a typical underdrain assembly.

An underdrain assembly 5 is shown in FIG. 1, according to one embodiment. The underdrain assembly 5 includes a base 10 that is comprised of a compact fill, such as concrete, which is placed in a designated underdrain area. The base 10 includes a trench 15 that provides a centralized fluid flow collection area. A flume plate 20, which is typically a steel plate, is inserted into the trench 15, and includes tubes 25 (shown in FIG. 9) for connecting to individual underdrains 30 located above the trench 15. A plurality of underdrains 30 traverse the trench 15 and the flume plate 20. The underdrains 30 include a bottom plate 35 which includes an opening for receiving the flume plate tube 25, and an upper structure 40 that prevents filter media from entering into the underdrain, while allowing fluid into the underdrain. A layer of filter media 45 is placed over the plurality of underdrains 30. Water 50 is then allowed to move over and through the filter media 45, through the underdrains 30, and through the trench 15. Alternatively, in the backwash process, water may be pushed through the trench 15, through the flume plate tubes 25, through the plurality of underdrains 30, and through the filter media 45.

Figure 2:
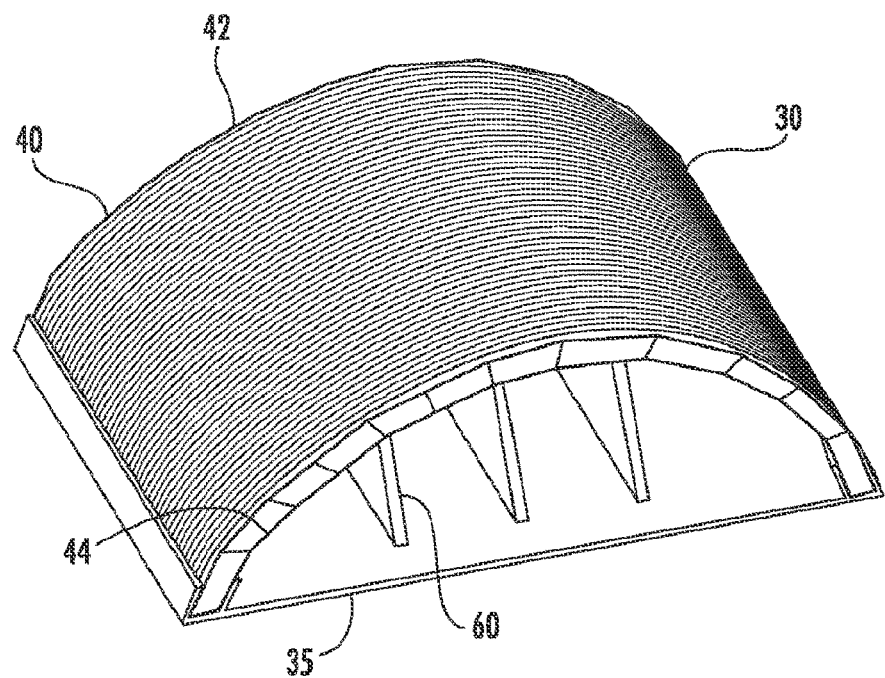
FIG. 2 is a perspective view of an underdrain according to one embodiment of the invention.

Various embodiments of underdrains are described herein, and all may be used in conjunction with the general underdrain assembly described above and shown in FIG. 1. FIG. 2 is a perspective view of an underdrain 30 according to one embodiment of the invention. The underdrain 30 includes a bottom plate 35, an upper structure 40 that prevents filter media from entering into the underdrain, and one or more flow control vanes 60 that extend at least partially within the underdrain 30.

Figure 3:
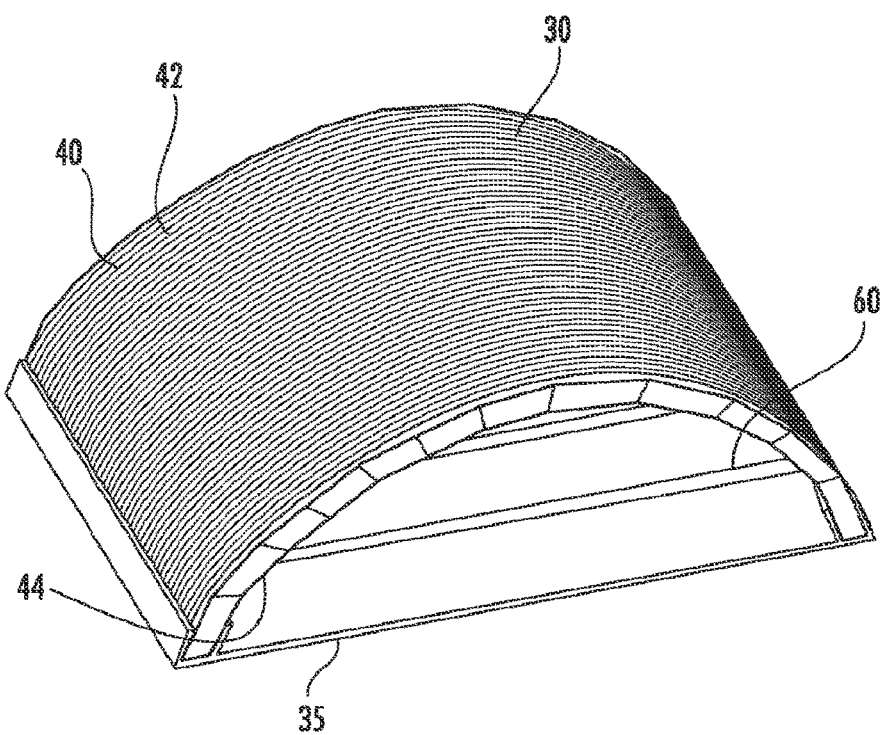
FIG. 3 is a perspective view of an underdrain according to one embodiment of the invention.

The upper structure 40 includes a first filtration member 42 such as a wire mesh screen, a plurality of screen elements, a perforated plate, or any other structure capable of filtering media known in the art. The first filtration member 42 allows water or liquid to flow through the upper structure 40 while preventing media and other particulates from moving through the upper structure 40. An exemplary first filtration member 42 includes a Vee-Wire® screen. Optionally, the upper structure 40 further includes a support member 44, which is coupled to the first filtration member 42. The support member 44 provides support to the first filtration member 42, which in turn supports the weight of the fluid and filter media sitting on top of the underdrain 30. The support member 44 includes holes or perforations that allow the fluid or water to flow through the upper structure 40. The support member 44 could be any structure that supports the weight of the fluid and includes holes. In one embodiment, as shown in FIGS. 2 and 3, the support member 44 is a series of channel rods with perforations or holes along the length of each channel rod. A channel rod in the embodiment shown is a member that extends longitudinally along the first filtration member 42 and includes a u-shaped cross section. The channel rods may run adjacent to one another wherein outer faces of sides of the channel rods interface, and wherein top portions of the sides interface with the first filtration member 42. In one embodiment, the support member 44 is a perforated plate that is adjacent the first filtration member 42. The perforations of any embodiment can be strategically placed to maximize the performance and tolerance of the air water interface plenum.

The upper structure 40 may be semi-cylindrical, arced or curved, as shown in FIGS. 2 and 3. The upper structure 40 may also be configured into a box-like structure with the first filtration member 42 on at least a portion of a top side. The first filtration member 42 could also be positioned on at least a portion of a side of the upper structure 40. It is contemplated that the upper structure 40 may comprise a variety of configurations, so long as water or liquid is allowed to flow through the upper structure 40 and prevent media and particulates from entering into the underdrain 30. The upper structure could be constructed to house multiple instances of the lower control devices.

The upper structure 40 connects to the bottom plate 35 of the underdrain 30. The bottom plate 35 of the underdrain 30 can be flat to allow fluid to uniformly move through the underdrain. Formed or curved shapes that enhance structural or flow performance can also be used. The bottom 35 includes at least one opening that leads to a trench 15, pipe or other header assembly beneath the underdrain 30. This opening can also be located at the ends of the underdrain for flow chambers with vertical cover plates. The opening allows water or fluid to drain into the trench 15 so that the water or fluid may be collected in a centralized location. The opening may also receive a flume tube from a flume plate 20 located in the trench 15 to assist with drainage of the fluid.

The underdrain 30 also includes one or more control vanes 60 for controlling the distribution of fluid flow within the underdrain 30. The control vanes 60 may restrict or redirect fluid flow to approximate the change in resistance that would be achieved with a variable geometry or step-down header without actually changing the geometry of the upper structure 40 of the underdrain 30. The control vanes 60 may be of any geometry, such as a rectangular plate, slotted plate, semi-circular plate or tubular configuration. The control vanes 60 may also be of any width or length, and such width or length may vary from control vane to control vane. The angle of the control vanes 60 relative to the centerline of the underdrain 30 can also be altered as needed to improve flow distribution and control. As shown in FIG. 2, in one embodiment, one or more control vanes 60 may extend at least partially from the upper structure 40 towards the bottom plate 35. In one embodiment, one or more control vanes 60 may extend at least partially from the bottom plate 35 toward the upper structure 40. In one embodiment, one or more control vanes 60 may extend from the upper structure 40 towards the bottom plate 35 while one or more control vanes 60 extend from the bottom plate 35 towards the upper structure 40. In one embodiment, one or more control vanes 60 can extend at least partially from a first side of the upper structure to a second side of the upper structure, as shown in FIG. 3.

One or more of the control vanes 60 may be positioned perpendicular to the bottom plate 35, as shown in FIG. 2. One or more of the control vanes 60 could be positioned at one or more angles with respect to the bottom plate 35. One or more of the control vanes 60 may also be positioned parallel to the bottom plate, as shown in FIG. 3.

In some embodiments, the control vanes can include one or more pipes or tubes of any appropriate cross-section that can be used in a similar fashion to the vertical or horizontal control vanes 60 described herein.

In one embodiment, one or more control vanes 60 may be incrementally placed along a longitudinal length of the underdrain 30, as shown in FIG. 4A. The spacing between each control vane 60 may vary or be equidistant from one another. FIG. 4A shows a cutaway perspective view of an underdrain 30, where two pairs of control vanes 60 are positioned perpendicular to the bottom plate 35 and parallel to one another. It will be appreciated that one or more additional control vanes could be oriented, for example, perpendicular to the bottom plate 35 and perpendicular to control vanes 60. In addition, the control vanes 60 need not be positioned parallel or perpendicular to each other, and it is contemplated that some or all of the control vanes can be positioned at a variety of angles with respect to each other. It is also contemplated that any number of control vanes 60 may be positioned along the longitudinal length of the underdrain 30 at various positions to provide a desired flow scheme and/or flow regime. For example, control vane 60 can be positioned over the opening 65 in the bottom plate 35 of the underdrain 30, and may, in one embodiment, extend into the trench 15 below the underdrain 30. The control vanes 60 may be positioned and angled along the longitudinal length of the underdrain 30 to achieve a desired fluid distribution along the underdrain 30.

Tubular geometry control vanes 60 can also be used. FIG. 4B shows a set of ring elements 60a and a tube element 60b disposed along the longitudinal length of the underdrain 30 at various positions. These ring/tube elements 60a, 60b can be positioned as desired to control the flow passing through the underdrain 30. FIG. 4B shows a non-limiting exemplary arrangement of a plurality of ring elements 60a and a tube element 60b along the length of the underdrain 30. As can be seen, the sizes of the ring elements 60a can be varied, as desired. In some embodiments, some or all of the ring elements 60a are concentrically arranged, though this is not necessary. Likewise, the use, placement and sizing of the tube element 60b (or elements) can also be varied to obtain a desired flow scheme.

In one embodiment, the underdrain 30 further comprises a top cap 70 for placement within the opening 65 in the bottom plate 35 of the underdrain 30. The top cap 70 may receive the flume tube 25 of a flume plate 20, such that fluid may flow into the top cap 70, out through the flume tube 25 and then into the trench 15. One embodiment of the top cap 70 is illustrated in FIG. 5. The top cap 70 may extend at least partially within or may be fully disposed within the underdrain 30. The top cap 70 is generally hollow with an outer wall 71 and an inner wall 73. While the embodiment of the top cap 70 in FIG. 5 is shown as being cylindrical, the top cap 70 could include alternate configurations, such as a box-like configuration. The top cap 70 includes one or more top cap openings 72 positioned along a side of the top cap 70 and extending from the outer wall 71 to the inner wall 73. The top cap openings 72 allow fluid to flow from the interior of the underdrain 30 into the top cap 70, and move through the opening 65 and into the trench 15 below the underdrain 30. The top cap openings 72 serve to provide a restriction for the fluid moving through the length of the underdrain 30. Optionally, the top cap 70 may further include one or more top cap control vanes 75 positioned within the top cap 70. The top cap control vanes 75 may extend from one side of the inner wall to a second side of the inner wall, or from a top portion of the top cap 70, and the top cap control vanes 75 may be positioned at any angle relative to the bottom plate 35. The top cap control vanes 75 may extend above or below the top cap 70. The top cap control vanes 75 further provide direction to the fluid flowing through the top cap and also help restrict fluid flow in certain configurations.

FIG. 6 is a perspective view of an underdrain 130 according to one embodiment of the invention. The underdrain 130 includes an upper structure 140 and a bottom plate 135, which are similar to those already described. The upper structure 140 includes a first filtration member 142, which allows water or liquid to flow through the upper structure 140 while preventing media and other particulates from moving through the upper structure 140. The upper structure 140 may optionally include a second filtration member 144, which in one embodiment, is a perforated plate. The second filtration member 144 may be coupled to the first filtration member 142 so as to support the first filtration member, or may be positioned a distance away from the first filtration member 142, as shown in FIG. 6. The second filtration member 144 includes perforations or holes that allow fluid or water to move through the upper structure 140. When the second filtration member 144 is positioned away from the first filtration member 142, as shown in FIG. 6, the second filtration member 144 effectively provides a restriction within the underdrain 130. The second filtration member 144 may optionally include one or more formations 146 as shown in FIG. 7A, which may also provide a restriction for fluid flow through the underdrain 130, or may provide direction to the fluid flow. The configurations may also allow control and separation of different types or phases of fluid flow, such as mixed air and water flows. The formations 146 may include cross-sectional shapes in an s-shape pattern, a concave or convex pattern, a z-shape pattern, a w-shaped patter, a v-shaped pattern, or any other pattern known in the art. In one embodiment, the underdrain 130 includes control vanes 60 which may be positioned between the first filtration member 142 and the second filtration member 144, or between the second filtration member 144 and the bottom plate 135. It is contemplated that the control vanes 60 could be configured in a variety of ways as previously discussed in order to distribute the fluid flow within the underdrain. The filtration member 144 can also be configured with a variable geometry to enhance the flow distribution, as shown in FIGS. 7B-7J. These arrangements illustrate exemplary configurations that can improve flow control, and can create a space for an air plenum to be developed in a more contained space. These options illustrate geometries with both an open bottom plenum (FIGS. 7B-7E) and a closed bottom plenum (FIGS. 7F-7J).

For example, FIGS. 7B-7I show an embodiment of an underdrain 130 with a plenum open to the interior of the underdrain 145. The underdrain 130 of this embodiment includes a first filtration member 142 and a spaced-apart second filtration member 144 formed as a multiply-trapezoidal shaped perforated plate. The second filtration member 144 thus provides the open bottom plenum 145 with a lower trapezoidal portion 145a and an upper trapezoidal portion 145b (see FIG. 7D). The upper trapezoidal portion 145b is in direct communication with an air inlet line 102. The air inlet line 102 may be coupled to a source of compressed or pressurized air (not shown) to provide a desired air plenum in an upper portion of the underdrain 130.

FIGS. 7F-7J show an embodiment of an underdrain 130 with a closed bottom plenum. The underdrain 130 of this embodiment includes a first filtration member 142 and a spaced-apart second filtration member 144. The second filtration member 144 is again formed as a multiply-trapezoidal shaped perforated plate. In this embodiment, however, the lower trapezoidal portion 145a and the upper trapezoidal portion 145b of the bottom plenum 145 are separated by a plate 144a (best seen in FIGS. 7F and 7I), thus separating the upper plenum portion from the lower plenum portion. The upper trapezoidal portion 145b is in direct communication with the air inlet line 102. The air inlet line 102 may be coupled to a source of compressed or pressurized air (not shown) to provide a desired air plenum in an upper portion of the underdrain 130.

Figure 7K:
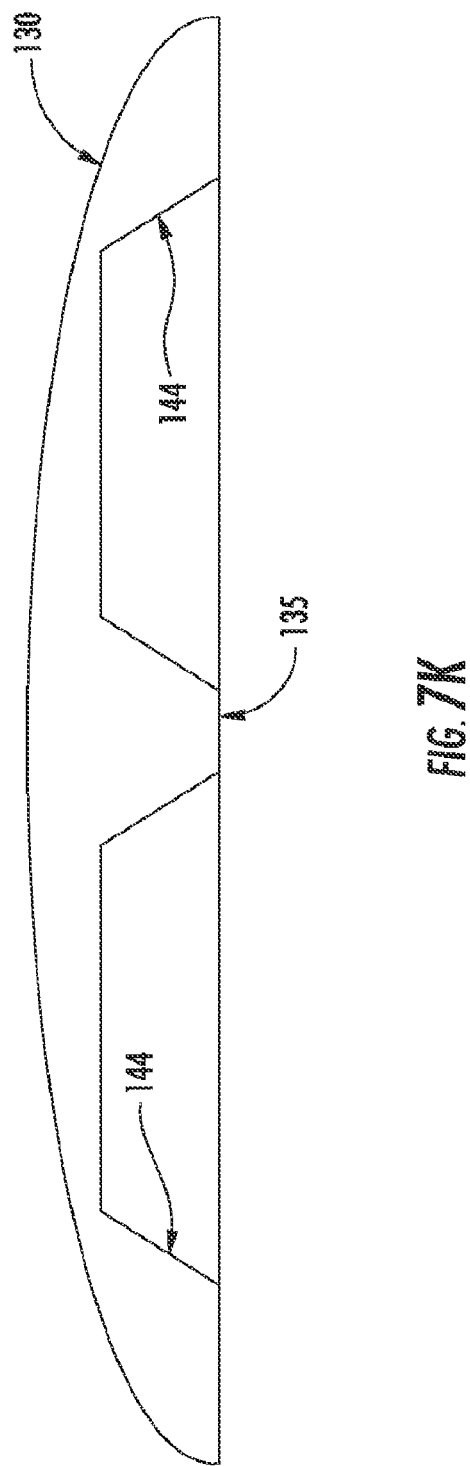
FIG. 7K is a cross-section view of an underdrain according to one embodiment of the invention.

FIG. 7K illustrates an embodiment of an underdrain 130 that employs multiple second filtration member 144. In this embodiment, a pair of second filtration members 144 are positioned side-by-side on the bottom plate 135. It will be appreciated, however, that greater numbers of second filtration members 144 can be used, as desired. It will also be appreciated that this multiple second filtration member 144 arrangement can be implemented in any or all of the embodiments described in relation of FIGS. 7A-7J.

As will be appreciated, the embodiments of FIGS. 7A-K employ a secondary screening surface to distance the filter media from the air release, providing better distribution and less damage to the media.

FIG. 8 is an illustration of a manifold assembly for a plurality of underdrains according to one embodiment of the invention. In one embodiment, each underdrain 30 includes an end connection 82 that connects to a manifold 80. The end connection 82 includes formations that may be accepted by a reciprocal receiving connection 84 included on the manifold 80. The manifold 80 provides one or more receiving connections 84 along a longitudinal length, wherein one or more underdrains 30 may connect. The manifold 80 may also provide the one or more receiving connections 84 on opposing sides of the manifold 80. For example, one underdrain 30 may connect to the manifold 80 from one side, and a second underdrain 30 may connect to the manifold 80 directly opposite of the other underdrain 30. The manifold 80 allows underdrains 30 to be accurately positioned relative to one another. Furthermore, the manifold 80 allows for easy installation of multiple underdrains 30 installed in series to obtain a desired length. It is contemplated that each underdrain 30 could be manufactured to a variety of standard lengths, each with the end connection 82 for connection to a manifold or an end cap. Depending on the design needs and underdrain length of a particular facility, an underdrain assembly could be easily and quickly assembled by joining multiple underdrains 30 via a manifold connection.

In one embodiment, the manifold receiving connection 84 includes at least one seal to prevent fluids from leaking out of the underdrain assembly and a locking assembly to couple the underdrain 30 to the manifold. In one embodiment, the receiving connection 84 of the manifold 80 and the end connection 82 of the underdrain 30 may include a Quick-loc™ connection. A receiving connection 84 and end connection 82 could be the connections, such as reference numbers 10, 14, for example, described in U.S. Pat. No.

8,516,678, entitled "Push Lock Pipe Connection System," which is herein incorporated by reference in its entirety.

It is also contemplated that instead of the manifold 80 having reciprocating receiving connections receiving end connections on the underdrains 30, that the underdrains 30 could include reciprocating receiving connections that receive end connections on the manifold.

Figure 9:
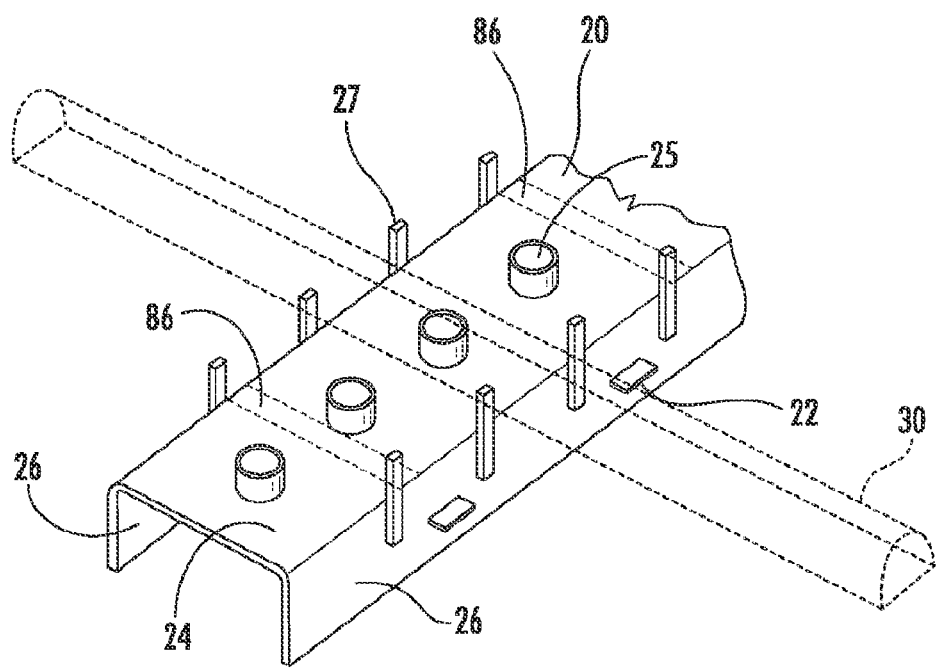
FIG. 9 is a perspective view of a flume plate for an underdrain assembly according to one embodiment of the invention.
Figure 7I:
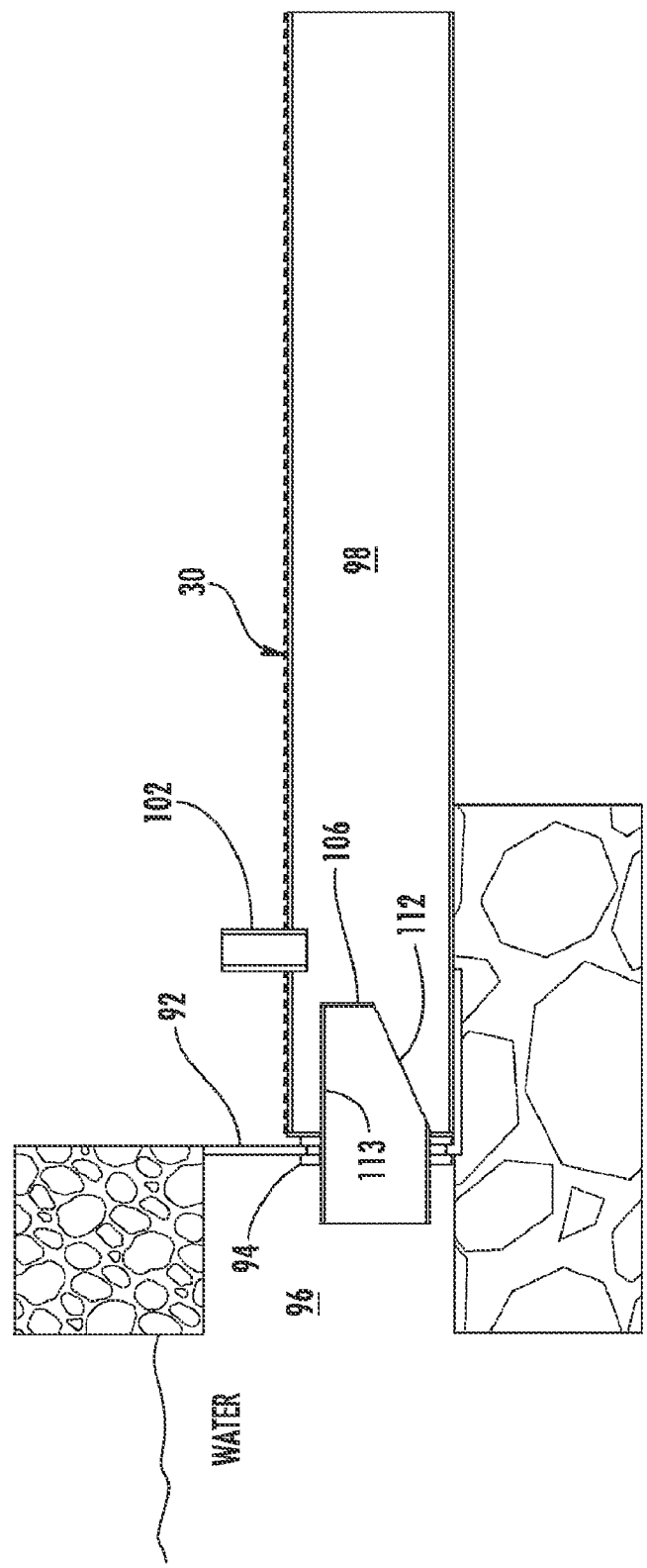
FIG. 7I is an end view of the underdrain of FIG. 7F.
Figure 15:
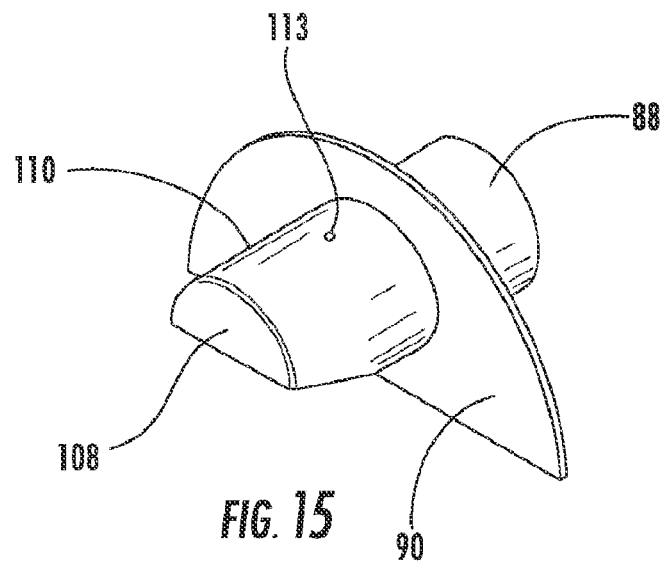
FIG. 15 is a detail view of a water inlet line and plate portion of the underdrain assembly of FIG. 10.

FIG. 9 is a perspective view of a flume plate 20 for an underdrain assembly according to one embodiment of the invention. The flume plate 20 is formed to fit within the trench 15 of an underdrain assembly. The flume plate 20 includes a top portion 24 and two side portions 26. The top portion 24 and two side portions 26 may consist of steel, but it is also contemplated that it could consist of other materials such as a polypropylene or other rigid material. The top portion 24 is substantially flat so that the bottom plate 35 of an underdrain may be adequately supported by the flume plate 20, and the flume plate includes one or more flume tubes 25 positioned along its longitudinal length. The flume tubes 25 are positioned within openings 65 in the bottom plates 35 of the underdrains 30. The flume plate 20 further includes one or more lock-in tabs 22 positioned on the side portions 26 of the flume plate 20. The lock-in tabs 22 are received by reciprocal slots in the trench 15 so that the flume plate 20 may not move from its position within the trench 15. The flume plate 20 may also include a plurality of anchors 27 coupled to the two side portions 26 of the flume plate 20. The plurality of anchors 27 extend upward and help position the underdrains 30, which generally run perpendicular to the trench 15 and flume plate 20, on the flume plate 20. Furthermore, the anchors 27 may optionally be coupled to the underdrains 30 to ensure the position of the flume plate 20 relative to the underdrains 30 remain constant. In one embodiment, the flume tubes 25 of the flume plate 20 extend into the manifold 80 that connects one or more underdrains 30 together and the anchors 27 are coupled to the manifold 80. In one embodiment, a tubular member or other connecting structure may be used in place of the flume plate 20 to direct fluid flow through the trench 15. The tubular member may also include smaller pipe extensions, which are then embedded into a floor of the trench, and may allow for the inflow or outflow of fluid.

In some embodiments the flume plate 20 may include one or more stiffeners 86 positioned on the upper and/or lower surface thereof to enable the thickness of the flume plate to be reduced. In the illustrated embodiment a pair of rectangular stiffeners 86 are provided on the lower surface of the flume plate 20. By adjusting the size, shape and/or position of these stiffeners 86 on the flume plate 20, fluid distribution may be adjusted as desired. For example, in some embodiments the stiffeners 86 may be arranged adjacent to each other to form a "V" shape that can be used to adjust fluid distribution. It will be appreciated that the stiffeners 86 can be formed from the same material as the flume plate 20, or they may be formed from a different material.

FIGS. 10-17 show an embodiment of the disclosed underdrain 30 in which a water inlet line 88 is provided at a longitudinal end 90 of the underdrain. The water inlet line 88 passes through, and is sealed to, a plate 92 via an elastomeric seal 94 such as a rubber gasket. Thus, on one side of the plate 92 the water inlet line 88 is exposed to a water chamber 96 to enable water from the water chamber to flow through the water inlet line 88 into an interior portion 98 of the underdrain 30. Air may be introduced into an air plenum portion 100 of the underdrain 30 via an air inlet line 102. In the illustrated embodiment, the air inlet line 102 is disposed through the top of the underdrain 30, but this is not critical and in some embodiments the air inlet line 102 may be positioned so as to introduce air horizontally into the air plenum portion 100. The air inlet line 102 may be coupled to an appropriate source of compressed or pressurized air (not shown) so as to force air through the air inlet line into the interior portion 98 of the underdrain 30. In some embodiments the air inlet line 102 may be coupled to an air header that itself is disposed on top of the underdrain 30 and acts as a hold-down bar for the underdrain. In some embodiments, the air inlet line may be coupled to an internal air pipe with perforations or other flow control devices to distribute air along the length of the underdrain assembly. This internal air header can be used independently, or in addition to a secondary distribution layer of channel rod or perforated plate.

As can be seen best in FIG. 12, an air/water interface 104 exists within the underdrain 30, with the air plenum portion 100 positioned above a water filled portion 106. As will be appreciated, it is desirable to prevent the air from the air plenum portion from flowing back through the water inlet line 88 into the water chamber 96. Thus, the water inlet line 88 may have an end plate 108 disposed at a first end 110 thereof. The end plate 108 may block off an upper portion of an opening 112 in the water inlet line 88. In some embodiments, the end plate 108 may be positioned so that a top end 108a is disposed in the air plenum portion 100 while a bottom end 108b is disposed in the water filled portion 106. Thus arranged, the opening 112 in the water inlet line 88 is disposed entirely within the water filled portion of the underdrain 30, thereby preventing air from the air plenum portion 100 from escaping into the chamber portion 96 via the water inlet line.

In the illustrated embodiment, the opening 112 in the water inlet line 88 is formed by an angular cut 114 made in the water inlet line 88 adjacent to the first end 110, and the end plate 108 is oriented substantially perpendicular with respect to a longitudinal axis A-A of the water inlet line 88. In some embodiments the angular cut forms an angle α with respect to the longitudinal axis of the water inlet line, which in the illustrated embodiment is parallel to the bottom plate 35 of the underdrain 30. The angular cut can be oriented with either a forward or a reverse angle as required to achieve the desired effect of isolating the gas phase (air) and liquid phase (water) flows. Other embodiments can include openings in the side of the inlet pipe that achieve the same effect. Thus arranged, the opening 112 in the second end forms a plane that is non-parallel to the longitudinal axis of the water inlet line. The size and orientation of the end plate 108 can be configured so that the opening 112 has the same or more cross-sectional area as a traditional open-ended pipe.

Figure 16:
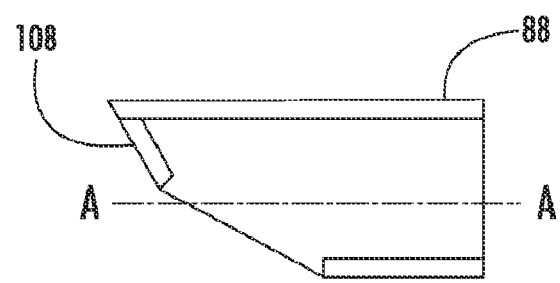
FIG. 16 is a partial cross-section view of an embodiment of a water inlet line of the underdrain assembly of FIG. 10.
Figure 17:
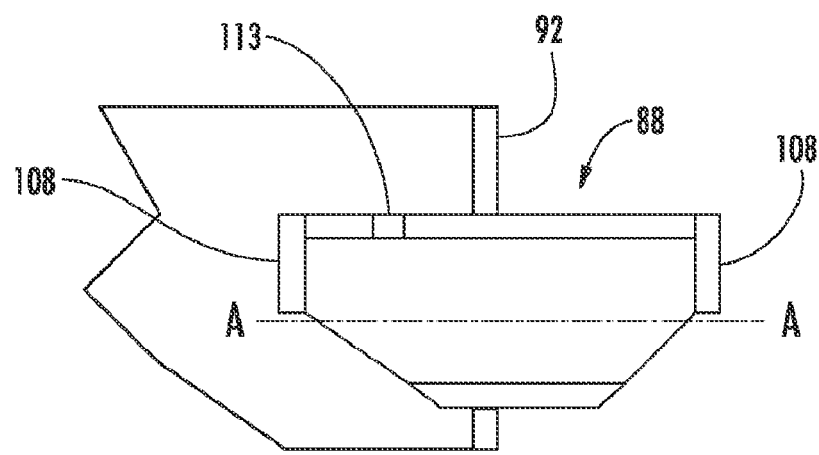
FIG. 17 is a partial cross-section view of another embodiment of a water inlet line of the underdrain assembly of FIG. 10.

In some embodiments, the end plate 108 can be oriented so as to be +/−15-degrees from an absolute vertical orientation with respect to the axis of the water inlet line 88. Such an arrangement is shown in FIG. 16, in which the plane of the end plate 108 is oriented at an oblique angle with respect to the longitudinal axis A-A of the water inlet line 88. In other embodiments, as shown in FIG. 17, an end plate 108 is disposed at both ends of the water inlet line 88 to further inhibit the ingress of air into the chamber 96. In this and other embodiments, a weep hole 113 may be disposed in a top portion of the water inlet line 88 to allow any air that may be trapped between the end plates 108 to escape.

FIGS. 18-21 show an alternative arrangement of an interface between the underdrain 30 and the plate 92 that covers the water chamber 96 (see FIG. 10). In this embodiment, the water inlet line 88 is engaged with, and sealed to, the plate 92. The longitudinal end 90 of the underdrain 30 includes an opening 91 for receiving the water inlet line 88 therein. The opening 91 may have a seal 93 for sealing against an outer surface of the water inlet line 88 and/or the plate 92. FIGS. 18 and 19 show the underdrain 30 positioned adjacent to the plate 92 prior to engagement with the water inlet line 88. FIGS. 20 and 21 show the underdrain 30 fully engaged with the water inlet line 88.

The embodiment of FIG. 21 also illustrates an alternative arrangement of the air inlet line 102. In this embodiment, the air inlet line 102 is partially disposed within the water inlet line 88, and has an inlet end 102d disposed on the chamber side of the plate 92 (out of the media basin). The outlet 103 of the air inlet 102 is disposed through an opening in an upper surface of water inlet line 88 within the underdrain 30. In some embodiments the outlet 103 is can direct air out of this upper surface of the water inlet line 88, or it could be augmented by an additional connecting pipe that helps to facilitate the air transfer into the underdrain 30.

FIGS. 22-29 show various alternative arrangements for enhancing the introduction of air into the underdrain 30. In some instances, these arrangements may improve and/or enable the distribution of air in cases in which a discrete air plenum is not viable. Although these embodiments show an air inlet line 102 positioned at the top of the underdrain 30, it will be appreciated that the air inlet line 102 can extend from any exterior surface of the underdrain, including end connections as will be described.

FIGS. 22 and 23 show arrangements of an air inlet line 102 that extends vertically from the top of the underdrain 30 to allow air to be introduced into the air plenum portion 100 of the underdrain. In the FIG. 22 embodiment, the air inlet line 102 is a vertically oriented tube that extends through the first filtration member 142. A distal end 102a of the air inlet line 102 may have an angled opening 103 to orient the flow of air in a particular direction. In the FIG. 23 embodiment, the air inlet line 102 may have a vertically oriented portion 102b that extends into the air plenum portion 100, and a horizontally oriented portion 102c disposed within the air plenum portion. As will be appreciated this arrangement can provide a desired orientation to the air introduced through the air inlet line 102.

FIGS. 24 and 25 show an embodiment in which a horizontally oriented air inlet line 102 is provided through the longitudinal end 90 of the underdrain 30. As can be seen, the air inlet line 102 of this embodiment is oriented parallel to the water inlet line 88, though this orientation is not critical and other orientations may also be used. The air inlet line 102 is also elongated so that it extends a distance "d" along the interior of the underdrain 30 to facilitate air distribution through the underdrain. The air inlet line 102 is shown as being disposed above the second filtration member 144. In some embodiments the elongated air inlet line 102 includes perforations. In the illustrated embodiment the second filtration member 144 is oriented at an oblique angle β with respect to the base plate 135 such that it is closer to the air inlet line 102 directly adjacent the longitudinal end 90 of the underdrain 30 and is progressively spaced apart from the air inlet line as it extends along the underdrain 30. As shown, the second filtration member 144 is angled downward within the underdrain 30. It will be appreciated that in addition to, or apart from, the angled arrangement of the second filtration member 144, the second filtration member 144 can also transition through different shapes (e.g., W-shaped, V-shaped, S-shaped) along its length.

FIGS. 26-29 illustrate an embodiment of the underdrain 30 in which an internal distribution pipe 105 is provided along the length of the underdrain in the air plenum portion 100. The internal distribution pipe 105 is thus positioned between the first filtration member 142 and the second filtration member 144. The internal distribution pipe 105 can be coupled to the air inlet line 102 to receive air from a pressurized air source. In the illustrated embodiment, the air inlet line 102 couples to the internal distribution pipe 105 near, but not at, the longitudinal end 90 of the underdrain 30. The air inlet line 102 can be perforated along all, or a portion of, its length. Although a single internal distribution pipe 105 is shown, it will be appreciated that multiple such internal distribution pipes may be employed, and may be oriented to reach any internal portion of the underdrain 30 desired. In addition, the internal distribution pipe 105 or pipes can be coupled to multiple air inlet lines 102, as desired.

Figure 30:
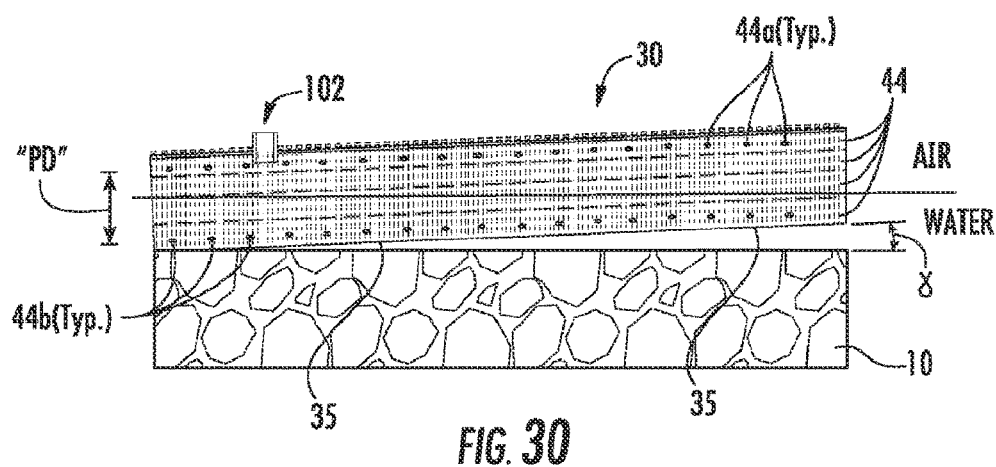
FIG. 30 is a cross-section view of an underdrain assembly according to an embodiment of the invention.
Figure 31:
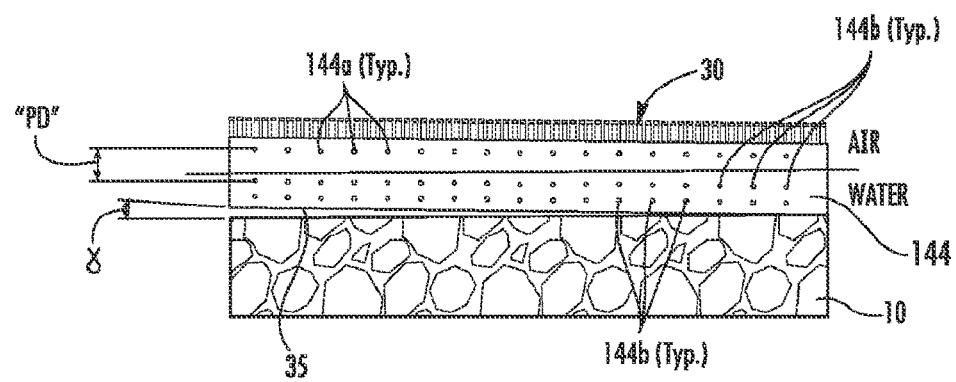
FIG. 31 is a cross-section view of an underdrain assembly according to an embodiment of the invention.

FIGS. 30 and 31 show arrangements of the underdrain 30 in which perforations in the channel rods 44 (see FIG. 2) or the second filtration member 144 are strategically placed such that differences in height along the length of the underdrain can be accommodated. This may be important because the concrete base 10 upon which the underdrain 30 sits may not always be perfectly level. For example, if positioned atop a non-level base 10, the underdrain 30 may be oriented at an angle γ with respect to horizontal. It is thus desirable to leave a large space between the perforations that will be subject to water and the perforations that will be subject to air so that the air/water interface 104 (see FIG. 12) can be maintained at a maximum tip angle γ.

In the FIG. 30 embodiment, the channel rods 44 positioned adjacent to the upper portion of the underdrain have perforations 44a that will be exposed to the air plenum in use. The channel rods 44 positioned adjacent to the bottom plate 35 have perforations 44b that will be exposed to the water filled portion 106. These perforations 44a, 44b may be separated by a distance "PD" that will enable a desired air/water interface 104 to be maintained even when the underdrain is oriented at a maximum tip angle γ. In the FIG. 31 embodiments, perforations are provided in the second filtration member 144. Upper perforations 144a may be provided in the second filtration member 144 where it is adjacent to an upper portion of the underdrain 30. One or more sets of lower perforations 144b may be provided adjacent to the bottom plate 35. The upper and lower perforation groups (144a, 144b) may be separated by a distance "PD" that will enable a desired air/water interface 104 to be maintained even when the underdrain is oriented at a maximum tip angle γ. An advantage of the arrangement shown in FIGS. 30 and 31 is that it may enable the underdrain 30 to be used without the need for additional external adjustment assemblies which are currently employed to level the underdrain when it is positioned atop a non-level base 10.

Figure 32:
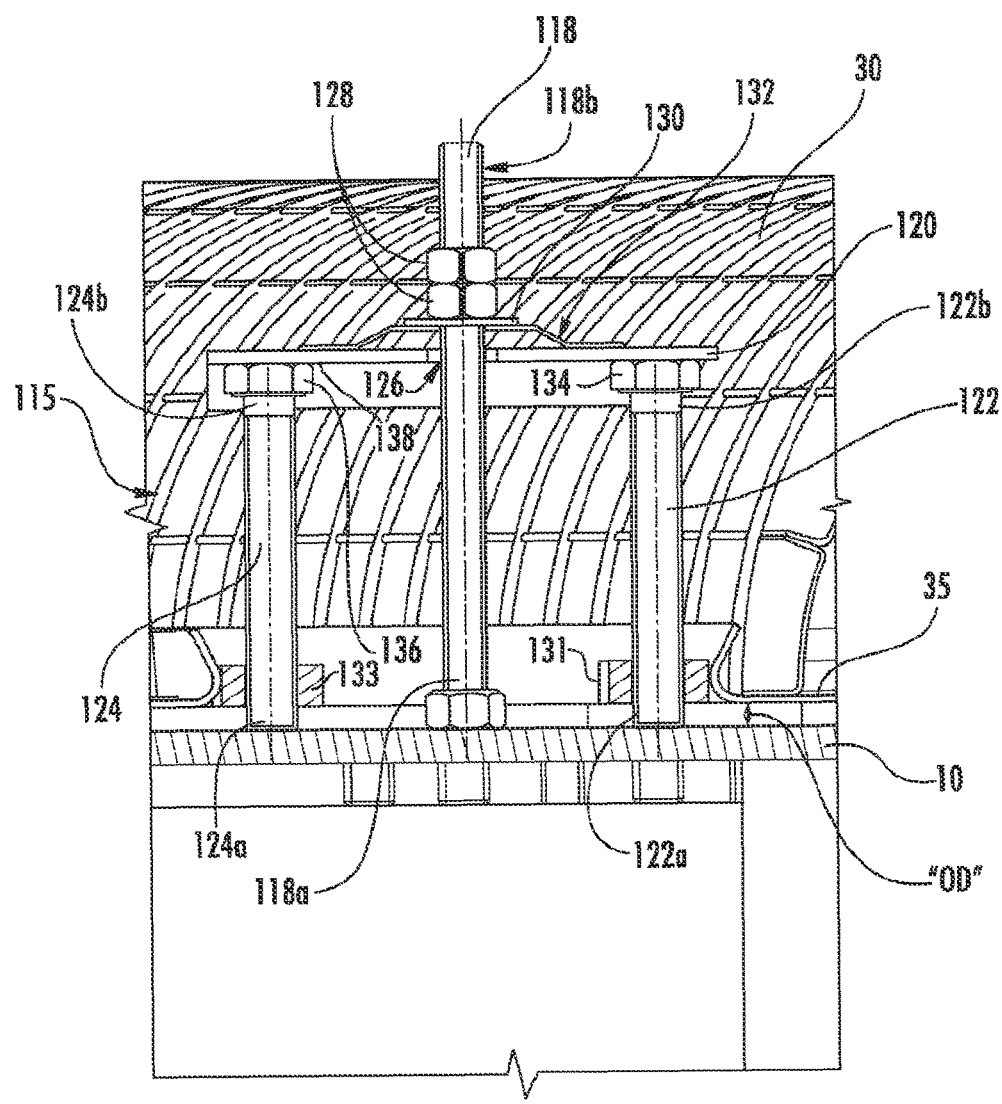
FIG. 32 is a side view of an improved hold-down mechanism for use with the disclosed underdrain assembly.
Figure 33:
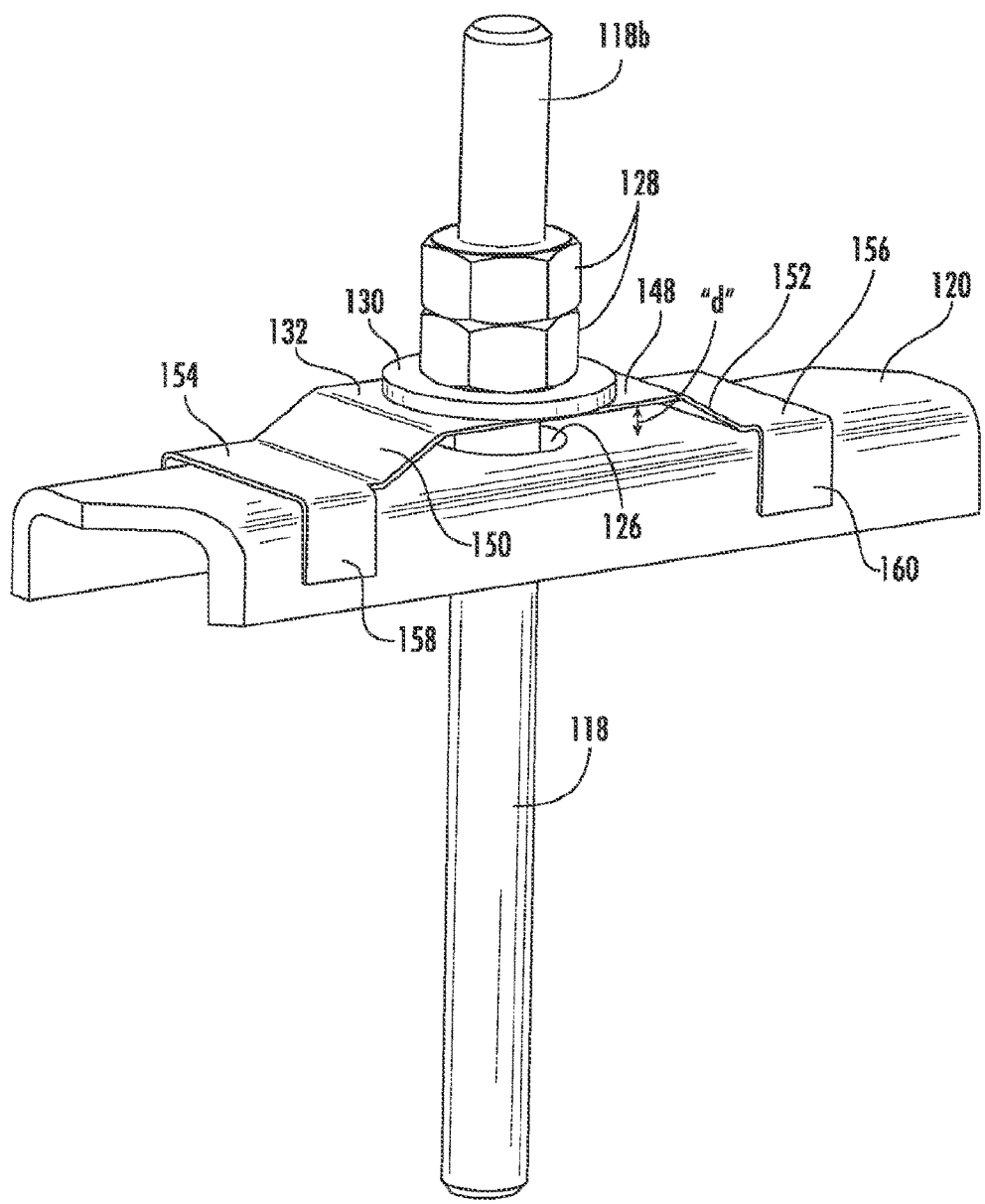
FIG. 33 is an isometric view of the hold-down mechanism of FIG. 32.

FIGS. 32 and 33 illustrate a hold-down mechanism 115 for the disclosed underdrains 30. The hold-down mechanism 115 can perform a variety of functions, including maintaining the underdrains 30 in a level state, and holding them in place during normal and backwash operations. The hold-down mechanism 115 can also include a shock absorbing feature 117 for providing a smooth distribution of forces during backwash operations and for reducing the effects of water hammer in the system. The added flexibility afforded by the shock absorbing feature 117 can extend the fatigue life of the hold-down mechanism 115 as well as one or more portions of the underdrains 30.

In the illustrated embodiment the hold-down mechanism 115 can include an anchor bolt 118, a hold-down bar 120 and first and second leveling bolts 122, 124. The anchor bolt 118 may have a first end 118a coupled to the base 10 (see FIG. 1), and a second end 118b that protrudes through an opening 126 in the hold-down bar 120 and engages one or more threaded nuts 128. A bottom-most of the threaded nuts 128 may bear against a washer 130, which itself engages a top surface of a resilient member 132. The resilient member 132 may be configured to hold the washer 130 at predetermined offset distance "d" from the hold-down bar 120.

The first and second leveling bolts 122, 124 may have first ends 122a, 124a that abut the base 10 and are received by first and second leveling nuts 131, 133 that are fixed, by welding, brazing or other appropriate technique, to the bottom plate 35 of the underdrain 30. Respective and second ends 122b, 124b of the first and second leveling bolts 122, 124 have bolt heads 134, 136 that abut an underside surface 138 of the hold-down bar 120.

As noted, the first end 118a of the anchor bolt 118 may be fixed to the base 10. By rotating the first and second leveling bolts 122, 124, the underdrain 30 can be raised or lowered with respect to the base 10, adjusting an offset distance "OD" between the bottom plate 35 and the base 10. The second ends 122b, 124b thus act as footings for the underdrain 30.

The resilient member 132 imposes a downward force against the bolt heads 134, 136, allowing the hold-down bar 120 to gently "ride" up and down depending upon the forces applied to the underdrain 30. In this way, a rigid connection between the anchor bolt 118 (and base 10) and the underdrain 30 is avoided, which as will be appreciated will result in less shock to the hold-down mechanism 115 and the underdrains 30 during operation.

In the illustrated embodiment (FIG. 33) the resilient member 132 is a leaf spring having a top base portion 148 and oppositely disposed first and second angled legs 150, 152. The first and second angled legs 150, 152 have respective first and second clips 154, 156 disposed at the distal ends of the first and second angled legs. The first and second clips 154, 156 each has a pair of ears 158, 160 that wrap around a portion of the hold-down bar 120 to provisionally the position of the leaf spring and the anchor bolt 118 with respect to the hold-down bar. The anchor bolt 118 is received through an opening (not shown) in the top base portion 148, and a washer—sandwiched between the lower-most of the one or more threaded nuts 128—bears against the top base portion. Upward motion of the hold-down bar 120 with respect to the anchor bolt 118 causes the leaf spring to compress, while downward motion of the hold-down bar with respect to the anchor bolt 118 causes the leaf spring to elongate. Both conditions result in the resilient leaf spring urging the hold-down bar 120 back to a neutral position with respect to the anchor bolt 118.

Although the illustrated embodiment shows the resilient member 132 as being a leaf spring, it will be appreciated that other resilient elements can be used instead (or in addition), including resilient (e.g., elastomeric) gaskets and/or o-rings, Belleville washers, and the like, to achieve a desired effect of dampening vibrations expected during operation of the device. In addition, although the illustrated embodiment shows the resilient member 132 positioned on top of the hold-down bar 120, it will be appreciated that the resilient member could instead be provided below the hold-down bar to achieve a desired dampening effect.

It will be appreciated that although the illustrated embodiments show the underdrain 30, 130 as having a circular cross section, some or all of the aspects of the disclosed flow control devices and other enhancements could be applied equally to an underdrain having semi-circular, elliptical, trapezoidal, rectangular or other cross section known in the art.

While the foregoing is directed to embodiments of the invention, other and further embodiments of the invention may be devised without departing from the basic scope thereof, and the scope thereof is determined by the claims that follow.

The invention claimed is:

1. An underdrain apparatus, comprising:
   an upper structure for filtering particulates from a fluid, the upper structure including at least one support member upon which a filtration member is supported;
   a bottom plate connected to the upper structure, said bottom plate including an opening for draining fluid into a trench;
   a top cap positioned within the opening, the top cap including at least one top cap opening through at least one side wall of the top cap;
   a flow control vane positioned within the top cap; and
   at least one flow control vane positioned between the at least one support member and the bottom plate.

2. The apparatus of claim 1, wherein the filtration member comprises a plurality of screen elements such that the at least one support member is positioned between the screen elements and the bottom plate, wherein the at least one support member includes at least one of one or more channel rods or a perforated plate.

3. The apparatus of claim 2, wherein the at least one support member comprises perforations.

4. The apparatus of claim 2, wherein the at least one support member includes the perforated plate, wherein" (i) the geometry of the perforated plate is varied in cross section along its length for flow control and/or (ii) the perforated plate includes at least one formation which may act as the flow control vane.

5. The apparatus of claim 1, further comprising a plurality of said flow control vanes positioned between the at least one support member and the bottom plate along at least a portion of a longitudinal length of the underdrain, wherein the plurality of flow control vanes are each positioned at one or more angles relative to the bottom plate.

6. An underdrain assembly, comprising:
   one or more underdrain apparatuses according to claim 1, the one or more underdrain apparatuses being positioned across the trench, wherein the opening of each bottom plate provides for draining the fluid into the trench.

7. The assembly of claim 6, further comprising a flume plate positioned in the trench for directing fluid flow, wherein the flume plate is adapted to be fully enclosed in the trench, the flume plate having a first side and a second side, the first and second sides each including a tab for insertion in sidewalls of the trench.

8. A manifold assembly for a plurality of underdrains, comprising:
   a plurality of underdrain apparatuses, according to claim 1, each of the plurality underdrain apparatuses comprising an end connection, and
   a manifold having a plurality of receiving connections disposed along a longitudinal length of the manifold, each of the plurality of receiving connections configured to receive the end connection of a respective one of the plurality of underdrain apparatuses, wherein the plurality of receiving connections include a locking assembly to lock the plurality of underdrains to the manifold.

\* \* \* \* \*